(12) United States Patent
Peoples et al.

(10) Patent No.: US 8,448,440 B2
(45) Date of Patent: May 28, 2013

(54) METHOD AND APPARATUS FOR ACHIEVING HIGHER THERMAL EFFICIENCY IN A STEAM ENGINE OR STEAM EXPANDER

(75) Inventors: Jerry A. Peoples, Harvest, AL (US); James V. Harmon, Sr., Mahtomedi, MN (US)

(73) Assignee: Thermal Power Recovery LLC, Mahtomedi, MN (US)

( * ) Notice: Subject to any disclaimer, the term of this patent is extended or adjusted under 35 U.S.C. 154(b) by 266 days.

(21) Appl. No.: 12/959,025

(22) Filed: Dec. 2, 2010

(65) Prior Publication Data

US 2011/0083434 A1 Apr. 14, 2011

Related U.S. Application Data

(63) Continuation-in-part of application No. 12/539,987, filed on Aug. 12, 2009, now Pat. No. 8,061,140, which is a continuation-in-part of application No. 12/492,773, filed on Jun. 26, 2009, now abandoned,
(Continued)

(51) Int. Cl.
| | |
|---|---|
| *F01B 29/04* | (2006.01) |
| *F01B 1/00* | (2006.01) |
| *F01K 23/06* | (2006.01) |
| *F01K 23/10* | (2006.01) |
| *F01K 27/00* | (2006.01) |
| *F01K 13/00* | (2006.01) |
| *F02B 33/44* | (2006.01) |
| *F02B 75/28* | (2006.01) |
| *F02B 75/30* | (2006.01) |
| *F15B 15/22* | (2006.01) |
| *F02M 33/02* | (2006.01) |

(52) U.S. Cl.
USPC ............... 60/712; 60/670; 60/597; 60/643; 60/676; 60/618; 60/616; 60/614; 91/22; 123/50 R; 123/520

(58) Field of Classification Search
USPC ................... 60/614–620, 517, 597–599, 712, 60/670–671, 676, 678, 642–643, 650, 659, 60/688, 691–693, 698, 784, 513; 91/22, 25, 91/242, 245, 471; 95/62, 65; 123/520, 50 R, 123/73 F, 73 FA; 251/129.15, 54, 339; 137/613, 137/505.42, 630, 185, 513.3, 100
See application file for complete search history.

(56) References Cited

U.S. PATENT DOCUMENTS

| | | |
|---|---|---|
| 51,081 A | 11/1865 | Pike |
| 175,485 A | 3/1876 | Miracle |

(Continued)

FOREIGN PATENT DOCUMENTS

| | | |
|---|---|---|
| DE | 3437151 A1 | 4/1986 |
| GB | 1750 | 0/1912 |

(Continued)

OTHER PUBLICATIONS

John R. Allen et al., Heat Engines, McGraw Hill Book Company, 1925, pp. 205-207: pp. 213-215.
(Continued)

*Primary Examiner* — Thai Ba Trieu
(74) *Attorney, Agent, or Firm* — Nikolai & Mersereau, P.A; James V. Harmon

(57) ABSTRACT

A high order of thermal efficiency is achieved in a steam engine or steam expander having a piston clearance that approximates zero together with a negligible amount of compression, such that pressure in the clearance volume approximates ambient pressure, i.e. atmospheric or condenser pressure as the case may be at the end of the piston return stroke when the clearance is essentially zero and constitutes a new engine apparatus and Rankine operating cycle that can be referred to as "zero clearance with zero compression". The steam admission valve assembly can be operated either automatically responsive to piston contact or by means of a cam shaft or electrically by means of a solenoid. A normally open exhaust valve permits residual steam to be exhausted through the piston return stroke, closed by the piston or cam then held closed by a fresh charge of steam.

65 Claims, 9 Drawing Sheets

Related U.S. Application Data which is a continuation-in-part of application No. 12/387,113, filed on Apr. 28, 2009, now Pat. No. 8,109,097, which is a continuation-in-part of application No. 12/075,042, filed on Mar. 7, 2008, now Pat. No. 7,997,080.

(60) Provisional application No. 61/309,640, filed on Mar. 2, 2010, provisional application No. 61/320,959, filed on Apr. 5, 2010, provisional application No. 60/905,732, filed on Mar. 7, 2007.

(56) References Cited

U.S. PATENT DOCUMENTS

| | | | |
|---|---|---|---|
| 606,739 A | 7/1898 | Rothgery | |
| 694,547 A | 3/1902 | Hood | |
| 753,647 A | 3/1904 | Thorson | |
| 845,622 A | 2/1907 | Du Shane | |
| 863,545 A | 8/1907 | McLachlan | |
| 1,011,516 A | 12/1911 | Stappen | |
| 1,027,380 A | 5/1912 | Fryer | |
| 1,128,125 A | 2/1915 | Fryer | |
| 1,169,672 A | 1/1916 | Palm | |
| 1,210,649 A | 1/1917 | Holley | |
| 1,217,788 A * | 2/1917 | Leidtke | 60/712 |
| 1,324,183 A | 12/1919 | Still | |
| 1,331,665 A | 2/1920 | Ohborg | |
| 1,332,633 A | 3/1920 | Parrish | |
| 1,359,988 A | 11/1920 | Hansen | |
| 1,427,395 A | 8/1922 | Kaschtofsky | |
| 1,489,291 A | 4/1924 | Tuerk | |
| 1,496,839 A | 6/1924 | Bohan et al. | |
| 1,502,918 A | 7/1924 | Scott | |
| 1,517,372 A | 12/1924 | Martineau | |
| 1,542,578 A | 6/1925 | Pool | |
| 1,601,995 A | 10/1926 | Butler et al. | |
| 1,629,677 A | 5/1927 | Bull | |
| 1,630,841 A | 5/1927 | Fusch | |
| 1,617,838 A | 5/1928 | Norberg | |
| 1,732,011 A | 10/1929 | Gouirand | |
| 1,802,828 A | 4/1931 | Perrenoud | |
| 1,913,251 A | 6/1933 | Smith | |
| 1,965,569 A | 7/1934 | Anderson | |
| 1,987,003 A | 1/1935 | Dole | |
| 2,000,108 A | 5/1935 | Tucker | |
| 2,040,453 A | 5/1936 | Weber | |
| 2,057,075 A | 10/1936 | Wuehr | |
| 2,058,485 A * | 10/1936 | Miller | 417/549 |
| 2,063,970 A | 12/1936 | Young | |
| 2,138,351 A | 11/1938 | McGonigall | |
| 2,341,348 A | 3/1940 | Welby | |
| 2,196,979 A * | 4/1940 | Campbell | 60/618 |
| 2,196,980 A | 4/1940 | Campbell | |
| 2,269,106 A * | 1/1942 | Hoffmann | 123/56.7 |
| 2,309,968 A | 2/1943 | Marburg | |
| 2,402,699 A * | 6/1946 | Williams | 91/471 |
| 2,560,449 A * | 7/1951 | Kahr et al. | 91/25 |
| 2,604,079 A | 7/1952 | Ray | |
| 2,632,464 A * | 3/1953 | Kerr | 137/413 |
| 2,649,078 A | 8/1953 | Kelly | |
| 2,671,434 A | 3/1954 | Schmiedeskamp | |
| 2,730,996 A * | 1/1956 | Doble | 91/22 |
| 2,943,608 A | 7/1960 | Williams | |
| 2,957,462 A | 10/1960 | Clark | |
| 3,033,181 A * | 5/1962 | Barnes et al. | 123/25 B |
| 3,200,798 A | 8/1965 | Mansfield | |
| 3,216,329 A | 11/1965 | Peterson | |
| 3,279,326 A | 10/1966 | Harvey | |
| 3,397,619 A | 8/1968 | Sturtevant | |
| 3,489,162 A * | 1/1970 | Meynell | 137/100 |
| 3,493,003 A | 2/1970 | Peoples | |
| 3,603,344 A * | 9/1971 | Stampfli | 137/513.3 |
| 3,609,061 A | 9/1971 | Peoples | |
| 3,650,295 A | 3/1972 | Smith | |
| 3,653,297 A | 4/1972 | Peoples | |
| 3,662,553 A | 5/1972 | Hodgkinson | |
| 3,719,322 A * | 3/1973 | Gifford | 236/102 |
| 3,759,141 A | 9/1973 | Zibrun | |
| 3,877,231 A * | 4/1975 | Tinker | 60/688 |
| 3,877,479 A * | 4/1975 | Miyawaki | 137/185 |
| 3,882,833 A | 5/1975 | Longstaff | |
| 3,908,686 A | 9/1975 | Carter et al. | |
| 3,921,404 A | 11/1975 | Mason | |
| 3,990,238 A * | 11/1976 | Bailey | 60/513 |
| 3,995,531 A | 12/1976 | Zibrun | |
| 4,023,537 A | 5/1977 | Carter, Sr. et al. | |
| 4,050,357 A | 9/1977 | Carter, Sr. et al. | |
| 4,077,214 A | 3/1978 | Burke et al. | |
| 4,079,586 A * | 3/1978 | Kincaid, Jr. | 60/784 |
| 4,168,655 A | 9/1979 | Kitrilakis | |
| 4,201,058 A | 5/1980 | Vaughan | |
| 4,300,353 A | 11/1981 | Ridgway | |
| 4,362,132 A | 12/1982 | Neuman | |
| 4,377,934 A | 3/1983 | Marshall | |
| 4,425,763 A | 1/1984 | Porta et al. | |
| 4,491,057 A | 1/1985 | Ziegler | |
| 4,509,464 A | 4/1985 | Hansen | |
| 4,561,256 A | 12/1985 | Molignoni | |
| 4,590,766 A | 5/1986 | Striebich | |
| 4,706,462 A | 11/1987 | Soltermack | |
| 4,724,800 A | 2/1988 | Wood | |
| 4,747,271 A | 5/1988 | Fisher | |
| 4,785,631 A | 11/1988 | Striebich | |
| 4,829,947 A | 5/1989 | Lequesne | |
| 4,864,826 A | 9/1989 | Lagow | |
| 5,121,607 A | 6/1992 | George, Jr. | |
| 5,385,211 A | 1/1995 | Carroll | |
| 5,657,962 A * | 8/1997 | Neron et al. | 251/129.15 |
| 5,803,022 A * | 9/1998 | Nelson et al. | 60/775 |
| 6,095,100 A * | 8/2000 | Hughes | 60/620 |
| 6,220,210 B1 | 4/2001 | Kobayashi | |
| 6,237,550 B1 | 5/2001 | Hatano | |
| 6,443,111 B1 | 9/2002 | LaDow | |
| 6,457,309 B1* | 10/2002 | Firey | 60/517 |
| 6,745,794 B2* | 6/2004 | Gajewski | 137/630 |
| 6,834,503 B2 | 12/2004 | Freymann | |
| 6,895,756 B2 | 5/2005 | Schmotolocha | |
| RE38,750 E * | 7/2005 | Weaver | 251/54 |
| 7,056,251 B2 | 6/2006 | Ibaraki | |
| 7,104,063 B2 | 9/2006 | Clemens | |
| 7,267,113 B2* | 9/2007 | Tsuge et al. | 123/520 |
| 7,536,943 B2 | 5/2009 | Pritchard | |
| 7,841,309 B2 | 11/2010 | Grundl | |
| 7,856,822 B2 | 12/2010 | Schoell | |
| 7,992,386 B2 | 8/2011 | Schoell | |
| 7,997,080 B2 | 8/2011 | Harmon, Sr. | |
| 8,061,140 B2 | 11/2011 | Harmon, Sr. | |
| 8,109,097 B2 | 2/2012 | Harmon, Sr. | |
| 2003/0226603 A1* | 12/2003 | Gajewski | 137/630 |
| 2005/0263189 A1* | 12/2005 | Nakamura | 137/505.42 |
| 2008/0216480 A1 | 9/2008 | Harmon | |
| 2009/0205338 A1 | 8/2009 | Harmon | |
| 2009/0293480 A1 | 12/2009 | Harmon | |
| 2010/0043896 A1* | 2/2010 | Shock et al. | 137/613 |
| 2010/0058751 A1 | 3/2010 | Chavez | |
| 2010/0095662 A1 | 4/2010 | Chavez | |
| 2010/0300100 A1 | 12/2010 | Harmon | |
| 2011/0083434 A1 | 4/2011 | Peoples | |
| 2012/0192561 A1* | 8/2012 | Coates | 60/616 |

FOREIGN PATENT DOCUMENTS

| | | |
|---|---|---|
| GB | 25356 | 0/1911 |
| GB | 28472 | 0/1913 |
| GB | 125395 | 4/1919 |
| GB | 130621 | 8/1919 |
| WO | WO 0231319 | 4/2002 |
| WO | WO 03050402 | 6/2003 |

OTHER PUBLICATIONS

Harry R. Solberg, et al, Elementary Heat Power, Second Edition, John Wiley & Sons, Inc., Copyright 1946, 1952, pp. 150-154: pp. 448-450: pp. 465-469.

Frank D. Graham, Audels Engineers & Mechanics Guide 2, Theo. Audel & Company, Copyright 1921, 1927, 1938, reprinted 1943, pp. 593 & 606.

Jerry Peoples, The Lore of Steam Automotive Power, Copyright 2007, privately published by Jerry A. Peoples, May 2007, pp. 47-60 & 90-118. Figures 9-8 to 9-12.

J.R. Allen and J.A. Bursley, Heat Engines,1925 Third Edition, pp. 210 and 211, McGraw Hill, New York, U.S.

Jerry Peoples, Gewgaws of Production Steam, The Steam Automobile Bulletin, Sep.-Oct. 2006, vol. 20, No. 5, pp. 7-13.

J.V. Haywood, Internal Combustion Engines, McGraw-Hill Book Co. 1988 pp. 657-659.

D.A. Low, Heat Engines, Longmans, Green & Co. 1949, pp. 246-248.

Marks, et. al., Marks' Standard Handbook for Mechanical Engineers, McGraw-Hill, Inc. 9th ed. 1987, pp. 9-36 to 9-38.

An Assessment of the Technology of Rankine Engines for Automobiles. Division of Transportation Energy Conservation, U.S. Energy Research and Development Administration, Apr. 1977, pp. 22-24.

Bill Cartland, Easy Starting Bash Valve, Steam Automobile Club of America, Inc. Technical Report No. 120, 1993, one page.

Ronald Loving, Low NOx Thermal Oxidizers, Steam Automobile Bulletin, vol. 20 No. 5, Sep.-Oct. 2006, pp. 28-30.

Tom Kimmel, The Leslie Engine, Steam Automobile Bulletin, vol. 21 No. 5, Sep.-Oct. 2007, pp. 14-16.

D.A. Arias, et. al., Theoretical Analysis of Waste Heat Recovery From and Internal Combustion Engine in a Hybrid Vehicle, SAE Technical Paper, 2006-01-1605, Apr. 3-6, 2006.

S.S. Miner, Developments in Automotive Steam Power Plants, SAE Technical Paper, No. 690043, Jan. 13-17, 1969.

BMW's Hybrid Vision: Gasoline and Steam, Popular Science Magazine, Mar. 2006, p. 22 (one page).

An Assessment of the Technology of Rankine Engines for Automobiles Div. of Transportation Energy Conservation, U.S. Energy Research & Develop. Admin., Apr. 1977, pp. 43-54.

* cited by examiner

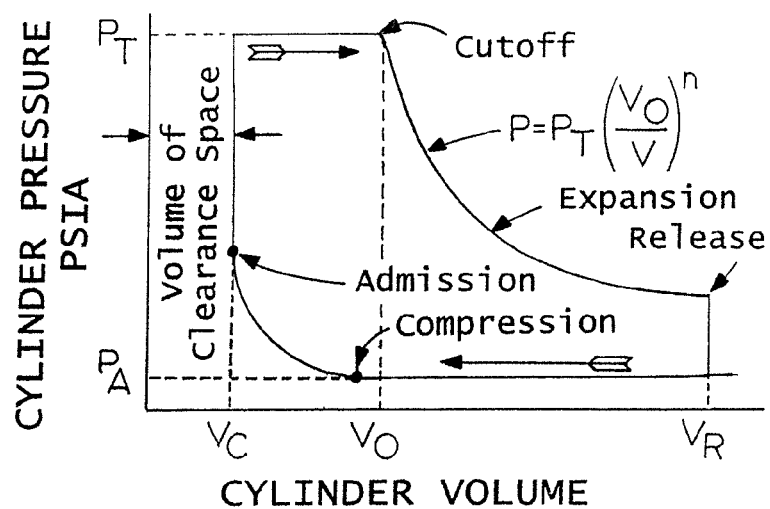
FIG. 1 (PRIOR ART)
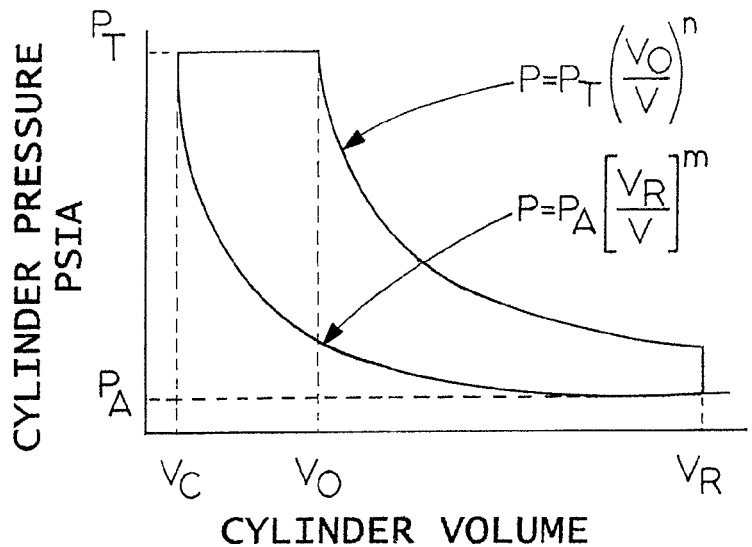
FIG. 2 (PRIOR ART)
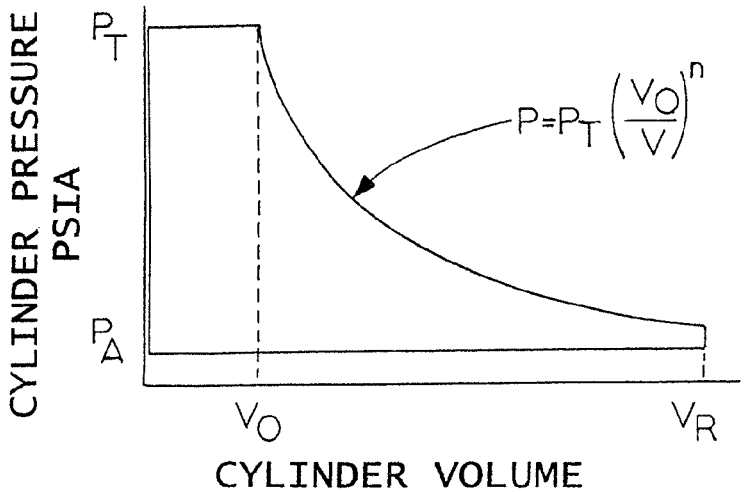
FIG. 3 INVENTION

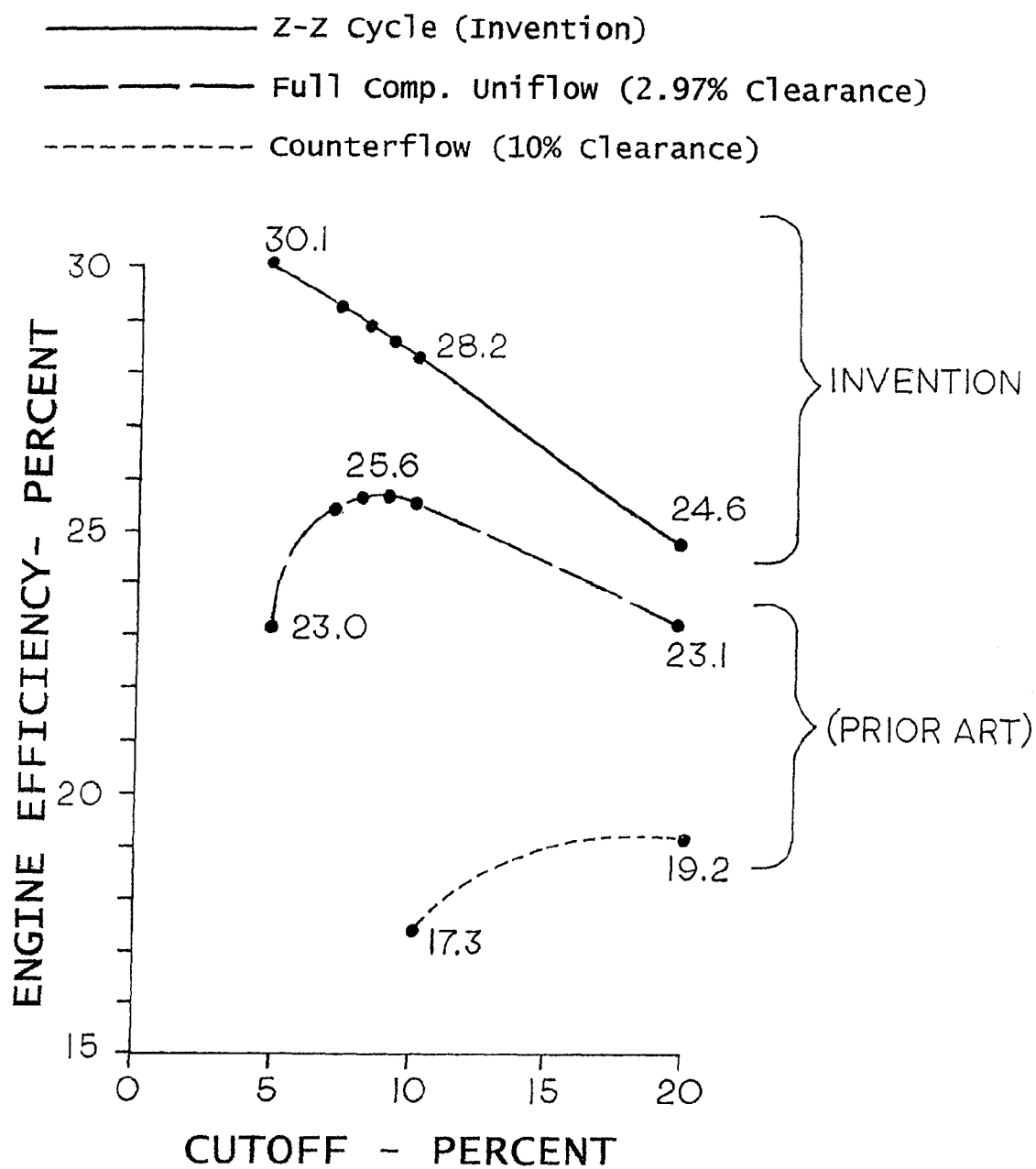

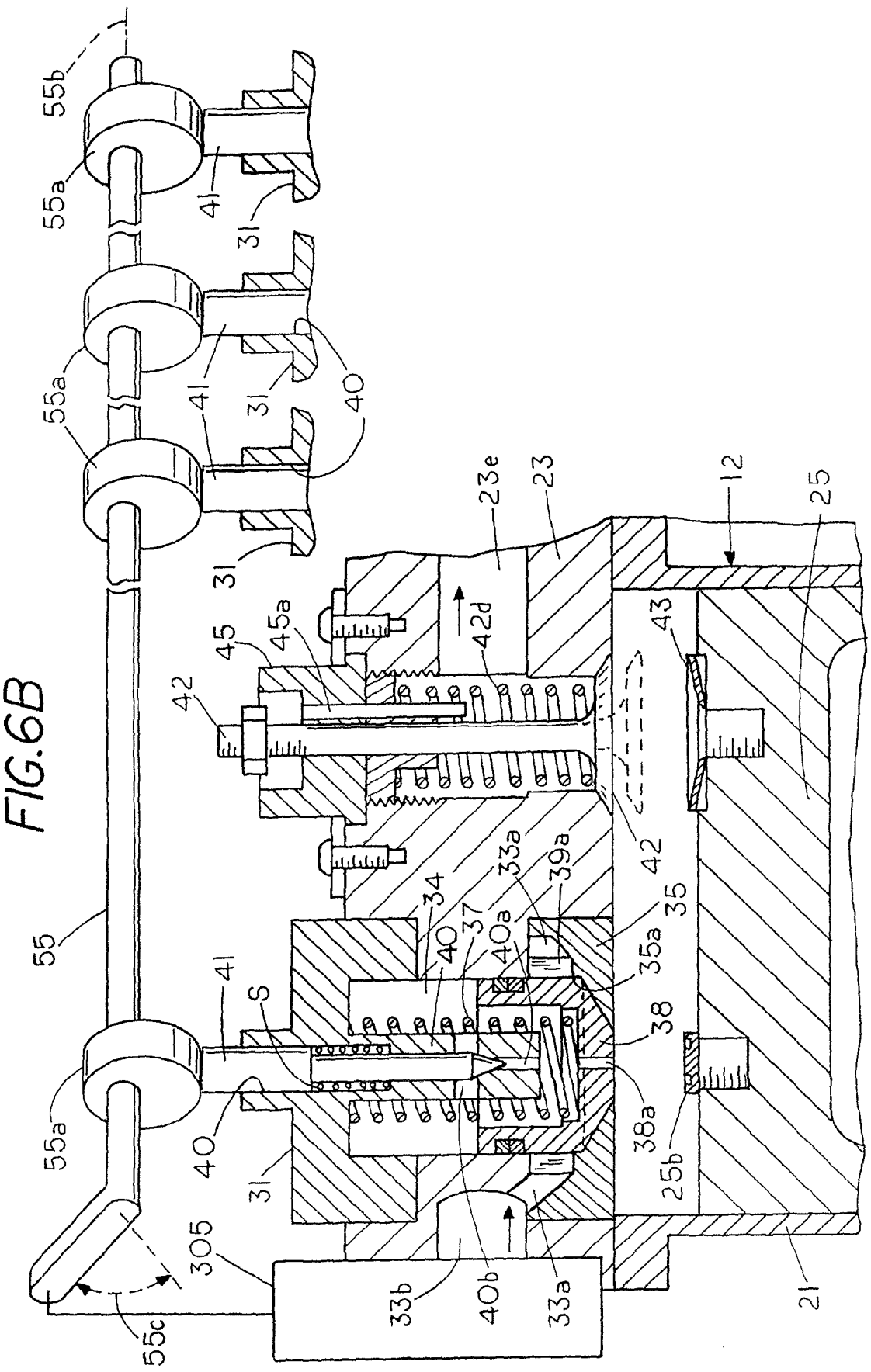

METHOD AND APPARATUS FOR ACHIEVING HIGHER THERMAL EFFICIENCY IN A STEAM ENGINE OR STEAM EXPANDER

DEPENDENCY FROM OTHER APPLICATIONS

The present application is a continuation-in-part of application Ser. No. 12/539,987, filed Aug. 12, 2009 now U.S. Pat. No. 8,061,140, which in turn is a continuation-in-part of application Ser. No. 12/492,773, filed Jun. 26, 2009 (now abandoned), a continuation-in-part of copending application Ser. No. 12/844,607, filed Jul. 27, 2010, a continuation-in-part of Ser. No. 12/387,113, filed Apr. 28, 2009 and Ser. No. 12/075,042, filed Mar. 7, 2008 now U.S. Pat. No. 7,997,080.

The applicants also claim the benefit of the following provisional applications: 61/309,640, filed Mar. 2, 2010; and 61/320,959, filed Apr. 5, 2010; and 60/905,732, filed Mar. 7, 2007, all of which are incorporated herein by reference.

FIELD OF THE INVENTION

This invention relates to steam engines as well as steam expanders that can be used as a part of a dual cycle engine, and especially to a method and apparatus for achieving higher efficiency in such engines and expanders.

BACKGROUND OF THE INVENTION

Steam engines which operate in accordance with the well-known Rankine cycle have excellent greenhouse gas emission characteristics compared to internal combustion engines and accept a wide range of liquid and solid fuels including even organic waste and biomass which makes steam power an especially attractive alternative to engines requiring refined petroleum. Moreover, a catalytic converter is not necessary to meet emissions standards since steam generator combustion temperature at atmospheric pressure is below that required to create compounds of $NO_x$. However, in the past, steam engines in smaller sizes suitable for use in cars and trucks have been inefficient compared to the internal combustion engine. A journal article *Expander Efficiency* by Stan Jakuba, Steam Automobile Club of America Bulletin, Vol. 14, No. 2, April-June 2000, giving the results of 21 Rankine development programs, listed steam engines with a service life of over two years as having an Actual Overall Cycle Efficiency that ranged from 6% to 17.2%, of which the best three averaged 14.4%. This level of efficiency is insufficient to be competitive with combustion engines for vehicular use.

Although it has been reported in the literature that a reduced clearance space between the piston at the top center position and the cylinder head will improve efficiency in a steam engine, a significant clearance volume has been present in the past. First, the steam inlet and outlet passages add a certain volume. In addition, in actual engines it has been traditionally considered important to provide a degree of compression at the end of each return stroke to achieve a cushioning effect, in other words, a steam cushion to help balance the reciprocating forces. For example, in U.S. Pat. No. 863,545, one object listed is to reduce clearance space. However, due to the cavities shown in the patent for allowing valve motion as well as what is referred to as a steam cross passage and head opening, a sizable clearance volume is unavoidable. Moreover, the need for two steam cam shafts with gearing adds to the cost and bulk of the engine.

OBJECTS AND ADVANTAGES OF THE INVENTION

In view of these and other shortcomings of the prior art it is the general object of the invention is to provide a new Rankine (steam) operating cycle that provides an extraordinary improvement in overall operating efficiency for a steam engine or expander enabling them to become competitive with the internal combustion engine in some vehicular applications.

Another object is to provide a steam engine expander for efficiently recovering waste heat energy from an internal combustion engine which typically wastes about two-thirds to three-fourths of the heat in the fuel that is consumed, thereby providing the prospect of an enormous saving in U.S. fuel imports which now amount to 9.667 million barrels per day (2009).

A more specific object is to provide a new steam operating cycle for a steam engine or steam expander that is substantially more efficient than the most efficient known steam cycle.

Yet another object of this invention is to provide a way to construct an engine that is effective in accurately timing the actuation of steam intake and exhaust from a steam expansion chamber which has virtually no empty pockets, recesses or ducts that contribute to the clearance volume.

Another object is to find a way to exhaust substantially all of the steam from a minute clearance space while at virtually the same instant admitting a fresh charge without impacting thermal efficiency from an engineering viewpoint as a result of losing admission mass directly to the exhaust outlet.

It is also an object to provide a valve, especially an automatic valve operating without an eccentric, camshaft or cam that eliminates counter-torque due to premature steam admission before dead center yet enables steam to enter efficiently after the dead center position is reached.

Another object is to provide an automatic steam inlet valve with a simple, self-contained way of varying the cutoff of steam into the steam expansion chamber during each power stroke while the engine is in operation.

Yet another object is to provide an easy-opening low impact-stress valve for admitting steam in which the opening force required is independent of steam pressure.

A further object is to provide a steam admission valve that will enhance engine efficiency by opening quickly with a snap action to reduce flow restriction characteristics of prior admission valves during the opening phase.

A further object is to provide a power source to assist in steam valve operation.

Still another object is to provide a simple mechanism that is able to time the operation of steam exhaust and admission valves using a single actuator for both.

These and other more detailed and specific objects and advantages of the present invention will be better understood by reference to the following figures and detailed description which illustrate by way of example but a few of the various forms of the invention within the scope of the appended claims.

BRIEF DESCRIPTION OF THE DRAWINGS

FIG. 1 is an ideal pressure-volume diagram for a counter-flow engine of the prior art.

FIG. 2 is an ideal pressure-volume diagram for a high pressure uniflow engine of the prior art in which residual steam is recompressed during the return stroke.

FIG. 3 is an ideal pressure-volume diagram for the present invention.

FIG. 4 is a graphic comparison of the indicated thermal efficiency performance of a counterflow engine, a high compression uniflow engine and the present invention.

FIG. 6B is a diagrammatic perspective view partly in cross-section showing the invention used in a multicylinder engine.

Figure 5:
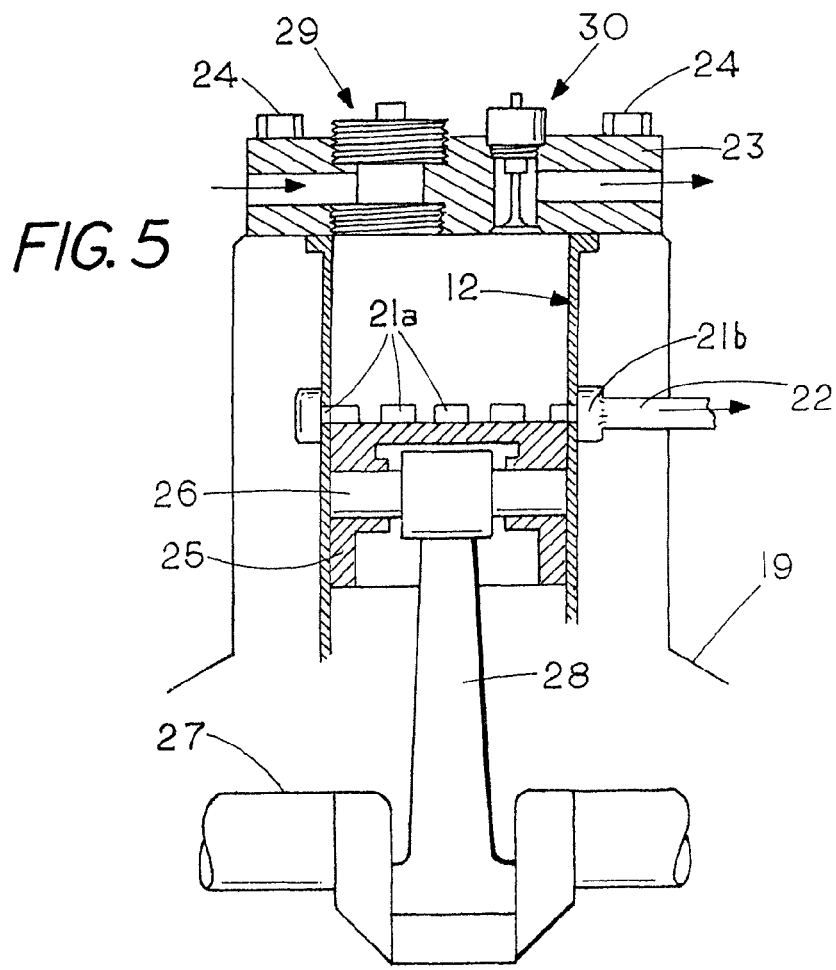
FIG. 5 is a semi-diagrammatic vertical sectional view taken through a steam engine embodying the present invention.

All publications, applications and patents cited herein are incorporated by reference to the same extent as if each individual publication, application or patent were specifically and individually reproduced herein and indicated to be incorporated by reference.

SUMMARY OF THE INVENTION

In spite of the far superior exhaust emission characteristics of a steam engine and its ability to use a variety of fuels including organic waste and biomass, steam engines have not been competitive with internal combustion from a thermal efficiency standpoint. In response to this and other problems, the present invention provides a method and apparatus for achieving remarkably improved thermal efficiency in a steam engine or steam expander. One important aspect of the invention results from discovery of a major advance that can be achieved by providing a piston clearance that approximates zero together with a negligible amount of compression, such that pressure in the clearance volume approximates ambient pressure or condenser pressure as the case may be at the end of the return stroke when the clearance is essentially zero. These two provisions working together simultaneously provide a method and apparatus which constitute a new engine apparatus and Rankine operating cycle that can be referred to as "zero clearance with zero compression". The invention also provides an improved steam admission valve assembly that can be operated either automatically responsive to piston movement or by means of a cam shaft and cam or electrically by means of a solenoid to produce an intermittent magnetic field for operating one or more valves with further efficiency. A biphasic exhaust system is described in which a piston operated valve opens to exhaust steam in a primary phase, and, in a later secondary phase an auxiliary, normally open exhaust valve facing the top of the piston permits virtually all residual steam to be exhausted through the approximate end of the piston return stroke after which it is closed by the piston or by the cam and finally held closed during the power stroke by a fresh charge of steam injected into the clearance volume through the steam admission valve.

DETAILED DESCRIPTION OF THE PREFERRED EMBODIMENTS

Steam engines currently available are represented by one of two design philosophies; counterflow or uniflow. The counterflow philosophy exemplified by the steam locomotive is based upon increasing work output by having compression work low at the expense of adding a generous portion of clearance between the piston and cylinder head at the end of the return stroke. The uniflow philosophy introduced in about 1907 and improved during the 1940's by Calvin Williams (U.S. Pat. Nos. 2,402,699 and 2,943,608) increased efficiency considerably over counterflow by lowering fuel energy input at the expense of substantial compression work. The compression of residual steam within the cylinder to throttle pressure allowed the engine to add heat to the cylinder and prevented a pressure drop as steam was injected at the beginning of the next power stroke.

A better understanding of the invention can be gained through a comparison of mathematical equations for Rankine cycles that describe the operation of previous steam engines and a new steam operating cycle of the present invention. The terms used to describe the mathematical relationships existing in the various cycles are listed below under the heading "NOTATIONS".

The two prior design philosophies, counterflow and uniflow, are shown by their respective idealized pressure vs. volume (P/V) relationships illustrated in graphs plotted mathematically in FIGS. 1 and 2, respectively. In FIG. 1, the curved line between compression and admission shows the pressure increase in an actual engine caused by the exhaust closure before TDC. This is disregarded in the ideal engine of Equation 1. Longer arrows in FIG. 2 show direction of piston motion. It has been shown that the efficiency resulting from an ideal counterflow engine of FIG. 1 is given by Equation 1 below which appears in the literature. These engines were referred to as counterflow because the valve gear accommodated an exhaust path counter to the admission path, i.e., the steam charge entered and left through the same valve port.

Efficiency of Counterflow Cycle in Which Steam Enters and Leaves Through the Same Valve 
Equation 1

$$\eta_{CF} = \frac{P_T}{\rho_S \Delta h} \frac{\left[\frac{xn - x^n}{n-1} - \frac{V_C}{V_R} - \frac{P_A}{P_T}\left(1 - \frac{V_C}{V_R}\right)\right]}{\left[x - \frac{Z_F}{Z_A}\frac{P_A}{P_T}\frac{V_C}{V_R}\right]}$$

An ideal P/V diagram of the high pressure uniflow principle, sometimes referred to the Williams Cycle is illustrated in FIG. 2 with the corresponding overall operating efficiency given below by Equation 2.

Representing Efficiency of High Compression Uniflow Operation in Which Residual Steam is Recompressed to the Throttle Pressure 
Equation 2

$$\eta_{UF} = \frac{P_T}{\rho_S \Delta h} \frac{\left[\frac{xn - x^n}{n-1} - \frac{V_C}{V_R} - \frac{1}{m-1}\frac{P_A}{P_T}\left(\left(\frac{V_C}{V_R}\right)^{1-m} - 1\right)\right]}{\left[x - \frac{Z_F}{Z_A}\frac{P_A}{P_T}\left(\frac{V_C}{V_R}\right)^{1-m}\right]}$$

These P/V diagrams are characterized by being free of engine friction, piston blow-by or radiation and convection losses. For purposes of comparison and clarity, the same will be assumed for the invention.

An important aspect of the present invention results from the discovery that a major advance can be achieved by providing operating conditions in a steam engine that approximate a zero piston clearance together with a negligible amount of compression such that the pressure in the clearance volume approximates ambient pressure or condenser pressure when a condenser is used at the end of the return stroke when the clearance approximates zero. These provisions working together simultaneously constitute a new operating cycle or method that can be referred to as a zero clearance with zero compression cycle or z-z-cycle (FIG. 3). In contrast to FIG. 3, it will be noted that the clearance volume shown in FIGS. 1 and 2 to the left of the enclosed area that represents work done by the engine, cannot contribute to the work performed in prior art engines. This fact applies to both the counterflow and uniflow design philosophies. By taking a different approach from the prior art, the present invention is able to eliminate major disadvantages of each of these prior design philosophies. The advance provided by the present invention results in part from the unique interaction achieved by providing operating conditions in a steam engine in which a zero piston clearance is approximated together with a negligible amount of compression. It has been found that in a steam engine or expander with these conditions working together simultaneously, the energy input of the high compression uniflow engine is reduced and loss in output due to the large clearance volume of a counterflow engine is eliminated. The final result is an extraordinary improvement in engine efficiency as will be described more fully below. In a preferred form of the invention, the transition from discharge through the exhaust valve to steam admission through the admission valve is substantially simultaneous. The term substantially simultaneous herein is intended to include the possibility of a slight lead in the closure of the exhaust valve. While the clearance is set to approximate zero, provision is also made to assure that the piston cannot strike the cylinder head under any possible conditions by allowing for thermal expansion and tolerance stack-up.

The z-z-cycle of this invention illustrated in FIG. 3 shows how the clearance volume approximates zero while at the same time there is virtually no compression of residual steam during the return stroke. Consequently, the work performed which is represented by the enclosed area is substantially larger than those of FIG. 1 or 2. FIG. 3 together with Equation 3 (below) also illustrate how the steam mass consumed per cycle unlike the prior cycles can be more effectively used in production of admission and expansion work for the same value of cutoff. In addition, efficiency continues to rise at cutoff levels below 10% instead of declining (FIG. 4).

The fundamental work equation of the z-z-cycle can be derived from basic thermodynamic relationships. The heat input is the product of the steam mass consumed per cycle and the enthalpy change ($\Delta h$) of the water through the steam generator (not shown).

Since $V_O = V_R x$, steam mass per cycle—$m = \rho_s V_O = \rho_s V_R x$ heat energy added per cycle—$= m\Delta h = \rho_s V_R x \Delta h$.

Representing Efficiency in the Zero Clearance With Zero Compression Cycle of the Present Invention — Equation 3

$$Work_{NET} = \sum Work = W_A + W_E - W_L \text{ Therefore}$$

$$Work_{NET} = P_T V_R \left[ \frac{xn - x}{n - 1} - \frac{P_A}{P_T} \right] \text{ and}$$

$\eta_{zz}$ = Cycle Efficiency $$= \frac{Work_{NET}}{m\Delta h}$$

$$= \frac{P_T}{\rho_s x \Delta h} \left[ \frac{xn - x^n}{n - 1} - \frac{P_A}{P_T} \right]$$

A performance comparison between counterflow, high compression uniflow and the z-z-cycle as a function of steam cutoff is given in FIG. 4. This data is based on supply conditions at 1000 psia and 1000° F. It will be seen in FIG. 4 that the indicated thermal efficiency of the z-z-cycle under the same conditions is very much greater than the high compression uniflow cycle which was previously the most efficient known steam cycle. Moreover, unlike the two prior cycles, the graphs show how efficiency of the invention improves at lower cutoffs rather than decline rapidly like the prior art which is especially important because a low cutoff is needed for optimum efficiency.

Since a true zero clearance can never be reached because the piston would then strike the cylinder head, due provision is also made to assure that the piston has sufficient clearance under any possible operating condition including an allowance for thermal expansion and tolerance stack-up. Although small amounts even in the range of about 4%-8% clearance or compression can be used in the invention, even these small amounts reduce thermal efficiency. Consequently in order to optimize the operation of the invention, they should both be lowered below that level as much as physical constraints permit. The term percent compression refers to the fraction of the maximum cylinder volume at which any compression begins and percent clearance refers to the height of the space between the piston and the head at top dead center (TDC) as a fraction of that at bottom dead center (BDC).

It is not the presence alone of an actual zero clearance or actual zero compression by itself that characterizes the invention, but rather the combination of a clearance volume that approaches or approximates zero working together simultaneously with a compression that also approaches or approximates zero at the end of the return stroke. In practice, an almost microscopic clearance between the piston and the head at the top dead center position is preferably less than about 0.080 inch and most preferably in a range of about 0.005-0.030 inch. This will usually be sufficient allowance for avoiding contact due to thermal expansion and tolerance stack-up. At the same time, virtually no compression is assured by the provision of several mechanical and design features of the invention that enable residual steam to be exhausted virtually until the piston confronts the cylinder head at top dead center and the steam admission valve is opened. In a preferred form, a biphasic exhaust is provided that includes a primary as well as an auxiliary exhaust phase. The primary exhaust can comprise a ring of ports in the cylinder proximate the bottom dead center position that preferably begin to open automatically about 136° after top dead center (TDC) and reach the full open position at bottom dead center (BDC) when the steam chamber reaches its maximum volume. An auxiliary exhaust port located in the cylinder head to be described more fully below is constructed to exhaust the remaining 30% of the residual steam mass.

It will be seen that in the two well-known prior art cycles of FIGS. 1 and 2, the ordinate representing the end of the cylinder is spaced to the left of the P-V diagram tracing by an area known as the clearance volume, the right side of which also corresponds to the position of the top of the piston at dead center. However, in the invention (FIG. 3), it will be noticed that at end of the return stroke of the piston, there is virtually no clearance between the piston and the cylinder head; only the minute clearance as required to prevent physical contact between the piston and the cylinder head. It will also be noted in FIG. 3 that the gauge pressure of the cylinder remains at a level of zero gauge or at condenser pressure because the auxiliary exhaust is constructed to provide continuous pressure relief throughout the return stroke to maintain a cylinder pressure that approximates zero at the end of the return stroke. In this way, the invention achieves a very much higher efficiency by approaching or approximating zero clearance while approximating a state of zero compression simultaneously. Under actual operating conditions, the auxiliary steam exhaust valve may close with the piston, say, about ⅛ inch (3.18 mm) from the cylinder head, trapping a minute fraction of the initial steam mass during the remaining stroke which is within the scope of the expression "approximating zero compression" since little work is performed in compressing it.

It was recognized by Watt that the admission of steam must be cut off early in the power stroke to enhance engine efficiency by enabling expansion work to be performed after the admission valve closes. Consequently, being able to achieve good efficiency when an early cutoff is provided is especially important and the present invention is surprisingly far more efficient than prior cycles when an early cutoff is used. For example, a comparison between the indicated efficiency of the z-z-cycle and the most efficient steam engine known (the high compression uniflow engine cycle of Equation 2) shows that at a cutoff of 9%, the efficiency of the invention is about 11% improved over the uniflow efficiency, however at a cutoff of 7%, it is about 16% improved, and remarkably at a cutoff of 5%, it is about 30% improved above the efficiency of the best steam cycle known. This is shown graphically in FIG. 4. At reducing cutoff levels, while efficiency of the invention improves, that of the prior art worsens.

NOTATIONS $\rho_S$ - density of supply stream
n - polytropic exponent of expansion
$P_T$ - throttle pressure
m - polytropic exponent of compression
$P_A$ - condenser pressure
$V_C$ - clearance volume
$V_O$ - cyl. volume @ cutoff
V - volume at large
$V_R$ - cyl. volume @ release
$Z_F$ - compressibility @ cutoff
x - cutoff = $V_O/V_R$
$Z_A$ - compressibility @ exhaust
$\Delta h$ - enthalpy change in steam generator
$\eta_{CF}$ - Thermal efficiency of counterflow $$W_A \text{ - Admission work} = P_T V_R \left(\frac{V_O}{V_R}\right)$$

P - pressure at large
$W_L$ - Energy lost in Exhaust = $P_A V_R$
$\eta_{UF}$ - Thermal efficiency of high compression uniflow $$W_E \text{ - Expansion work} = \frac{P_T V_R}{n-1}\left[\left(\frac{V_O}{V_R}\right) - \left(\frac{V_O}{V_R}\right)^n\right]$$

Because the possibility of physical contact between the piston and the cylinder head must be prevented and an allowance made for thermal expansion and tolerance, the zero condition for compression and clearance can only be closely approached but never achieved in practice. However, when used together simultaneously, although zero in each case is only approximated, the present invention provides both a thermodynamic cycle and engine design that achieves a new order of performance which does not differ substantially from that which would have been achieved had it been possible to actually reach zero for both clearance and compression.

To achieve the desired z-z-cycle and engine operating characteristics, several design features are used in combination. First, the crankshaft piston and connecting rod are dimensioned so that the piston closely approaches the cylinder head in order to achieve a virtual zero clearance. In addition, the cylinder, piston, crankshaft and connecting rod are formed or selected to provide clearance changes due to thermal expansion considered together with accumulated tolerances that are within the acceptable limits to prevent contact between the piston and the cylinder head during any possible operating condition. In addition, the valves are both preferably placed in the cylinder head. Also, the preferred admission valve and exhaust valve both comprise poppet valves with the admission valve opening in a direction proceeding away from the clearance volume while the exhaust valve is the opposite, opening toward the clearance volume. The face of both valves is preferably aligned or close to alignment with a confronting upper surface of the piston when the valves are in the closed position thereby reducing the clearance volume to a minimum since the faces of both valves will then be spaced about the same distance from the piston as the cylinder head itself. Thus, a clearance volume is made possible in which no pockets, recesses or passages are present. In a typical application of the invention, the height of the clearance volume will usually be only a small fraction of its maximum height at BDC, for example, about 0.2-3.0% and most preferably from about 0.2-0.5%.

Figure 6A:
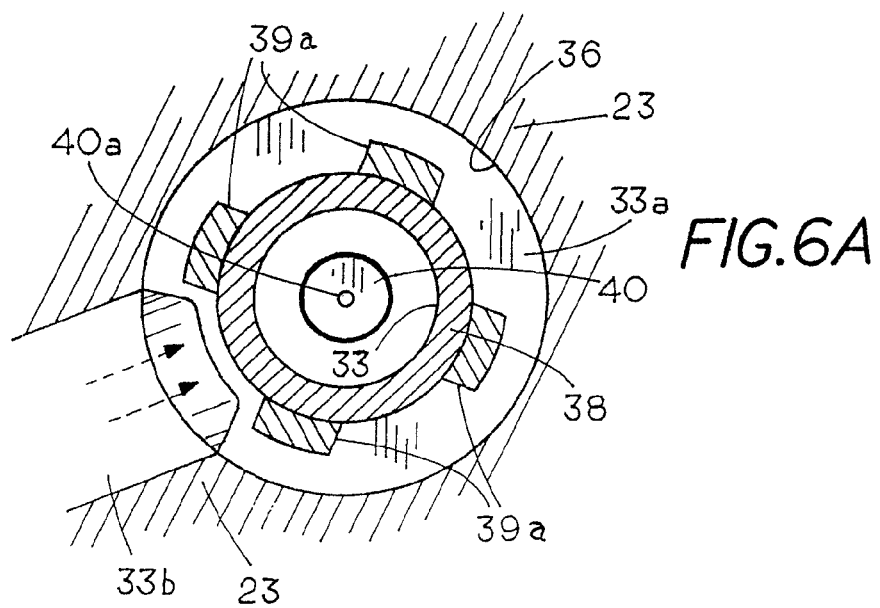
FIG. 6A is a transverse sectional view from below taken on line 6A-6A of FIG. 6.
Figure 6:
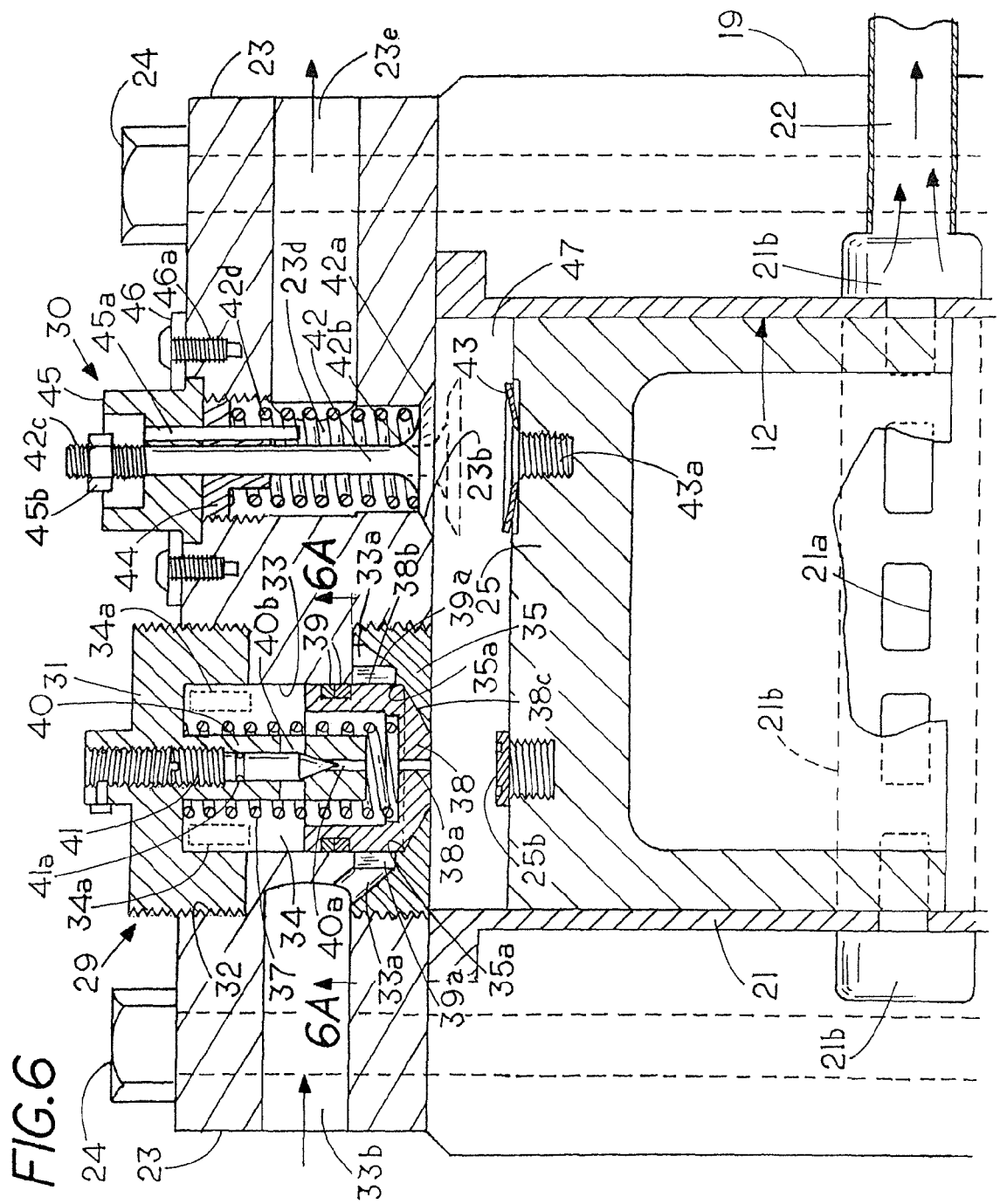
FIG. 6 is an enlarged partial view similar to FIG. 5 of the upper half of the engine.
Figure 7:
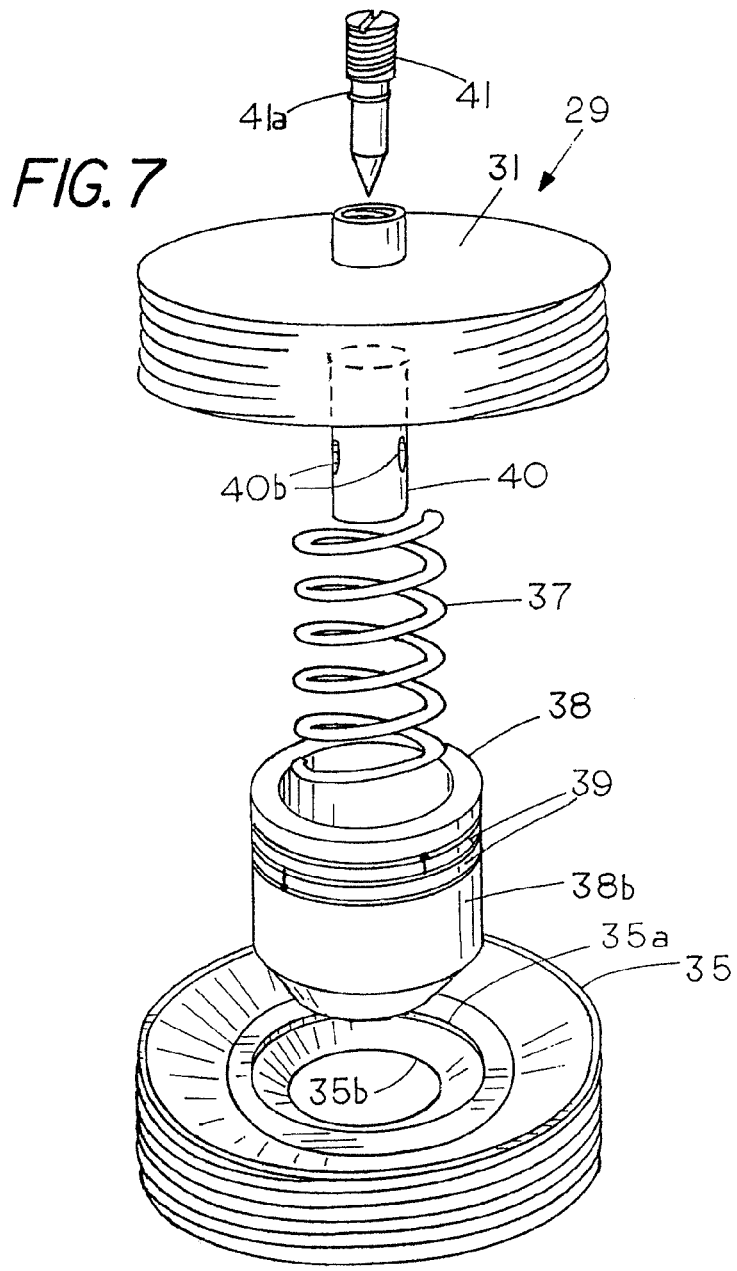
FIG. 7 is an exploded perspective view of the steam admission valve of FIG. 6 on a larger scale.

Refer now to an example of the invention shown in FIGS. 5, 6 and 6A. FIG. 6 illustrates the upper end of a steam engine according to the invention having a cylinder 12 which in this case is a liner sleeve 21 affixed within an engine block 19 to which a cylinder head 23 is secured by bolts 24. Slidably and sealingly mount inside the cylinder 12 is a piston 25 having a wrist pin 26 that is operatively connected to a crankshaft 27 by connecting rod 28 (FIG. 5). The sleeve 21 forming the cylinder 12 is provided with a ring of primary exhaust ports 21a which allow spent steam to be exhausted when the piston 25 is proximate the bottom dead center position shown in the figure by opening automatically as the top of the piston clears the openings 21a. The top of the ports 21a can be about 136 degrees from the top dead center position. From ports 21a, steam flows into annular manifold 21b and is exhausted through pipe 22. In the cylinder head 23 is provided a steam admission valve assembly 29 (FIGS. 5, 6, and 7) and an exhaust valve assembly 30 which will now both be described.

Briefly, the inlet valve assembly 29 comprises a steam pressure assisted normally closed poppet valve piston 38 with a peripheral cylindrical sidewall 38b sealingly mounted to reciprocate within the cylinder head. It is constructed in such a way that the opening force required is independent of steam pressure as well as having a provision to eliminate countertorque upon opening as now will be described. The inlet valve assembly 29 in this case has a valve cover 31 formed from bronze or stainless steel secured by means of screw threads within a cylindrical bore 32 in the stainless steel cylinder head 23 and having a downwardly opening annular pocket to hold compression spring 37 for a cup-shaped poppet valve piston 38 slidably and sealingly mounted in a valve cylinder bore 33 in the head 23. At the lower end of the bore 33 is an annular steam admission chamber or steam chest 33a that communicates with high pressure steam inlet duct 33b connected to a throttle and steam supply (not shown). Inside the bore 33 above valve 38 is a cylindrical valve timing chamber 34. At the lower end of the head 23 is a hardened steel valve seat 35 which is threaded in place within a bored opening in the lower face of the cylinder head 23. Valve 38 which is yieldably biased against the upper conical sealing surface of the valve seat 35 by means of the compression spring 37 is a cup-shaped poppet valve formed from hardened high carbon or stainless steel that has a conical downwardly directed sealing surface 38c which engages and seals against a conical valve face of the seat 35 when the valve is closed. The poppet valve 38 has a peripheral cylindrical sidewall 38b above the conical seal surface 38c that is slidably mounted for reciprocation in the cylindrical chamber 34 within bore 33 and sealed by two cast iron compression rings 39 pinned with gaps 180° apart. The conical sealing surface 38c of valve element 38 at the lower end of the valve body extends on a diagonal proceeding downwardly and centrally from the peripheral sidewall 38b which is aligned above its outer edge. Valve 29 is not a balanced valve. Instead, the sidewall 38b acts as a steam-pressure isolating surface that prevents the pressure of steam in the surrounding annular steam chest 33a from exerting an axial force on the valve as long as the valve is closed. By the term "poppet" valve is meant a valve that lifts bodily from its seat. In this case however it also slides axially relative to the admission manifold or steam chest 33a and axially along a short rim 35a below steam chest 33a surrounding the upper edge of conical sealing face of the valve seat 35 which serves to delay the admission of steam until the valve 38 clears the rim and thus can be thought of as an opening delay element. Rim 35a is sealingly engaged with poppet valve 38 and can have a height, for example, of about 0.035 in. (0.89 mm).

Extending downwardly from the upper part of the cover 31 is a cylindrical metering barrel 40 having a central bore in which is screw threaded for adjustment a steam flow metering needle 41 that is sealed in the central bore of the barrel 40 by means of a rubber O-ring 41a. A conical point at the lower end of the needle 41 can be raised or lowered by screwing the needle up or down to control the flow of steam through a tapered metering orifice 40a from port 38a abutting the lower end of the metering barrel 40 into chamber 34 through ports 40b. The needle 41 serves as a timing control for selecting and regulating the fraction of the power stroke during which steam is admitted into the cylinder 12, i.e., the steam cutoff. Valve 38 is yieldably biased to the closed position shown by spring 37. However, once opened, valve 38 is held open momentarily by maintaining a steam pressure differential across it. To control the open period, one selects the position of needle 41 so as to regulate the rate of change in the steam pressure differential across valve 38 to achieve the timing desired. In this way, one can regulate the fraction of the power stroke that the inlet valve remains open (the cutoff) during each cycle throughout operation. As steam is injected into the cylinder 12 and flows through the orifice 40a past a needle 41, it will pass through ports 40b filling chamber 34 at the rate selected by needle 41 until the point is reached at which the pressure differential is reduced enough relative to that in the cylinder 12 to be overcome by the downward force of the compressed spring 37 which will then drive valve 38 against the valve seat 35 thereby regulating the fraction of the power stroke when the admission of steam is cut off. At the end of the power stroke and during exhaust the pressure above valve 38 will fall to ambient. The cycle is then repeated continuously throughout operation as steam admitted through valve 29 causes the piston 25 to reciprocate in the cylinder 12 so as to impart rotation to the crankshaft 27 via the connecting rod 28. Thus, in accordance with the invention the valve is held open by the steam pressure existing in the expansion chamber while regulating the flow rate of the steam from one side of the valve 38 to the other, i.e., across the valve.

If the metering barrel is formed from a magnetically permeable material, it can also serve as the core of an electrical valve actuator solenoid mounted above the cover 31 (not shown) or, if desired, at 34a within the chamber 34 surrounding the metering barrel 40 as indicated by dotted lines so that when actuated by a suitable electrical power supply the solenoid will provide an intermittent magnetic field for opening the valve 38 at precisely timed intervals for starting or if desired for running. The steam admission valve 38 is however preferably opened by the piston 25 or by a lifter 25b that could be secured to the valve or alternatively to the top of the piston as shown with its upper surface in this case about 0.058 in. (1.47 mm) above the piston top surface 25a. At the lower end of the bore 33 is a circle of circumferentially distributed axially extending guide columns 39a also shown in FIG. 6A to keep poppet valve 38 centered.

The various lifters described herein which are attached to the piston are advantageous since they can be formed from hardened steel or alternatively both lifters can be springs. A steel cover 25c is placed over a lifter of spring 25d (FIG. 8) which is secured in place by screw 25e with the spring connected to the piston adjacent a pocket therein as shown, and the spring is constructed and arranged to be compressed into the pocket of the piston. Removable lifters can be changed to alter the lift height if desired. An exhaust lifter is not utterly essential since the exhaust valve can be closed by the flat upper surface of the piston itself if desired, or either valve operated even by a downward projection on either of the valves. If the exhaust lifter is omitted allowing the piston surface to close the exhaust valve, inlet steam will hold it closed as the piston descends during the power stroke. However, if the piston alone does not close the exhaust valve reliably, a shallow steam transfer groove (not shown) can be provided in the top surface of the piston between the valves to enhance closing pressure as steam is injected into the clearance volume at TDC. In an engine in which counter-torque is not significant, the sealing rim 35a can be eliminated allowing the valve 38 to open as soon as it leaves the seat 35.

In a four cylinder engine (FIG. 6B) each of four needles 41 is slidably mounted in a barrel 40 instead of being threaded and each is urged off its seat by a spring S. A control rod 55 having four identical eccentrics 55a is used to move the four needles 41 the same distance toward their seats as the rod 55 is turned on its own axis 55b through a selected arc 55c. The rod 55 is positioned by an electronic engine management computer 305 (also shown in FIG. 9) of suitable known construction to vary the cutoff of steam to the cylinders 12 to control efficiency and power while the engine is in operation.

Figure 8:
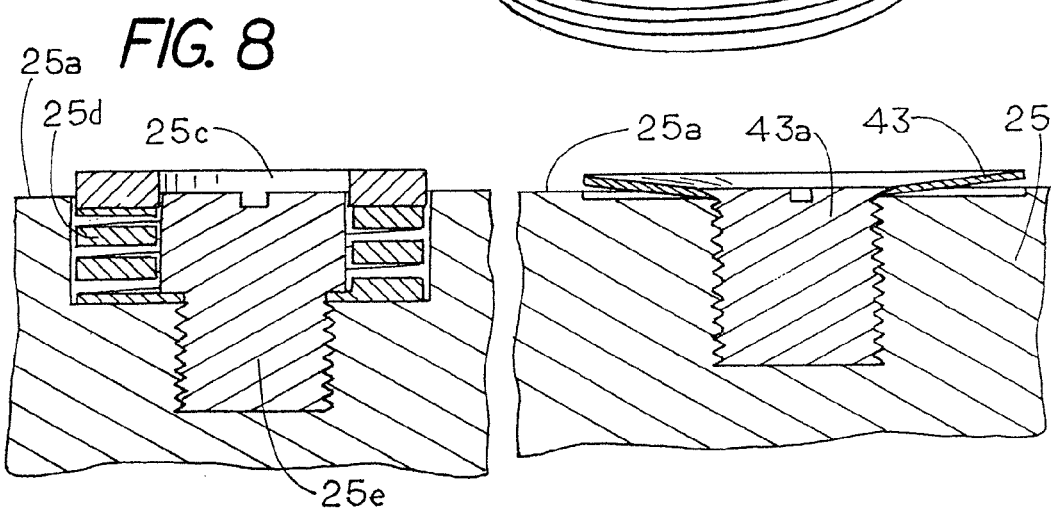
FIG. 8 is a partial vertical sectional view of the top of the piston showing two different kinds of valve lifters.

Refer now to the exhaust valve assembly 30 (FIG. 6) which includes a normally open poppet valve 42 having an upper conical valve face 42a that is able to form a seal against downwardly directed valve face 23b in the head 23 surrounding an exhaust port that communicates with an exhaust passage 23d leading to exhaust duct 23e in the cylinder head 23. The valve 42 is yieldably biased in the open position by means of a helical compression spring 42d that is adjustably compressed between a valve guide 44 threaded within the head and the mushroom shaped head 42b of valve 42. The upper end of the valve stem 42c of valve 42 is slidably mounted in bored opening, through guide 44 and an aligned bore through a valve adjustment knob 45 that is itself mounted for rotation coaxially of valve 42 and secured in placed by a retaining ring 46 that can be fastened to the head 23 by means of screws 46a. When knob 45 is rotated, a pin 45a extending from it through the guide 44 rotates the threaded guide thereby raising or lowering the guide to adjust the spring tension as required to time the opening of valve 42. The clearance distance (lift) of valve 42 can be adjusted by a nut 45b threaded on the upper end of the stem of valve 42 and held in place in any suitable manner as by means of a lock nut (not shown). During operation, the exhaust valve which extends about 0.25 in. from the inner surface of the cylinder head when in the open position is closed by means of (in this case) a lifter comprising a Belleville or washer spring 43 that is secured to the piston 25 by a retaining screw 43a (FIG. 8). A helical compression spring 25d can be attached to the piston in place of the Belleville spring if desired.

The piston 25, connecting rod 28 and crankshaft 27 are dimensioned such that the top surface 25a of the piston when in the top center position is the located to approximate a zero clearance from the lower surface of the cylinder head as well as the inward facing surfaces of the poppet valves 38 and 42; in this case a gap of about 0.020 inch to allow for thermal expansion and connecting rod and wrist pin tolerances. It will seen that since the valve assemblies 29 and 30 are both positioned in the cylinder head and that each opens and closes a port also located in the cylinder head, the inward face of each of the valves 38 and 42 can be positioned to confront the opposing surface of the piston by a distance that approximates zero as the piston reaches the upper end of the return stroke. The clearance approximating zero is therefore established between the top of the piston and both valves 29 and 30 as well as the cylinder head.

In operation, the upper surface of the lifter 25b will strike the poppet piston valve 38 when the height of the clearance volume is about 0.058 in. from the top center position. Even after the conical valve sealing surface 38c is lifted off its seat as the piston continues to rise, the valve admission delay rim 35a will momentarily keep the valve from opening due to the seal it makes with the adjacent outer surface of the cylindrical wall 38b of valve element 38. This prevents power-robbing reverse torque caused by an injection of steam while the piston is still rising and readies the valve for full admission. However, when valve 38 clears the top of the sealing rim 35a, high pressure steam at typically at least about 800° F. and 800 psia is injected almost instantaneously from the steam chest 33a past the valve seat 35 and into the clearance volume instantly forcing valve 38 open with a snap action owing to sudden upward thrust caused by the high pressure of the steam now exposed to its lower surface at which point full admission is achieved. The upper surface of the resilient lifter 43 is positioned to bring exhaust valve 42 to the closed position substantially simultaneously with the opening of valve 38 while also avoiding compression of steam in the clearance volume as the last bit of the residual steam exits past the exhaust valve. However, if the lift of valve 42 is, say, 0.25 inch, the resilient valve lifter 43 will have just previously engaged exhaust valve 42 (normally held in the dotted line open position by the spring 42d) moving it to the closed position. This is considered to be within the meaning of the term substantially simultaneous as used herein. When valve 42 closes fully, the resiliency of lifter 43 enables the piston to continue moving toward the cylinder head until the top center position is reached after which the injected steam will then hold it closed until exhaust is released through ports 21a.

It is important to note that because the supply steam surrounds valve 38 in annular chamber 33a but is not exposed to an end of the valve or any other transverse surface as long as the valve is closed, the valve 38 is yieldably biased to its closed position by the force of spring 37 which is independent of the steam supply pressure that at, say, 800 psi would make the valve very difficult to open and subject to excessive wear or fracture. Yet when valve 38 opens only slightly, the entire force of the steam supply is exposed to its lower end, snapping it open with a steam power assist.

Figure 9:
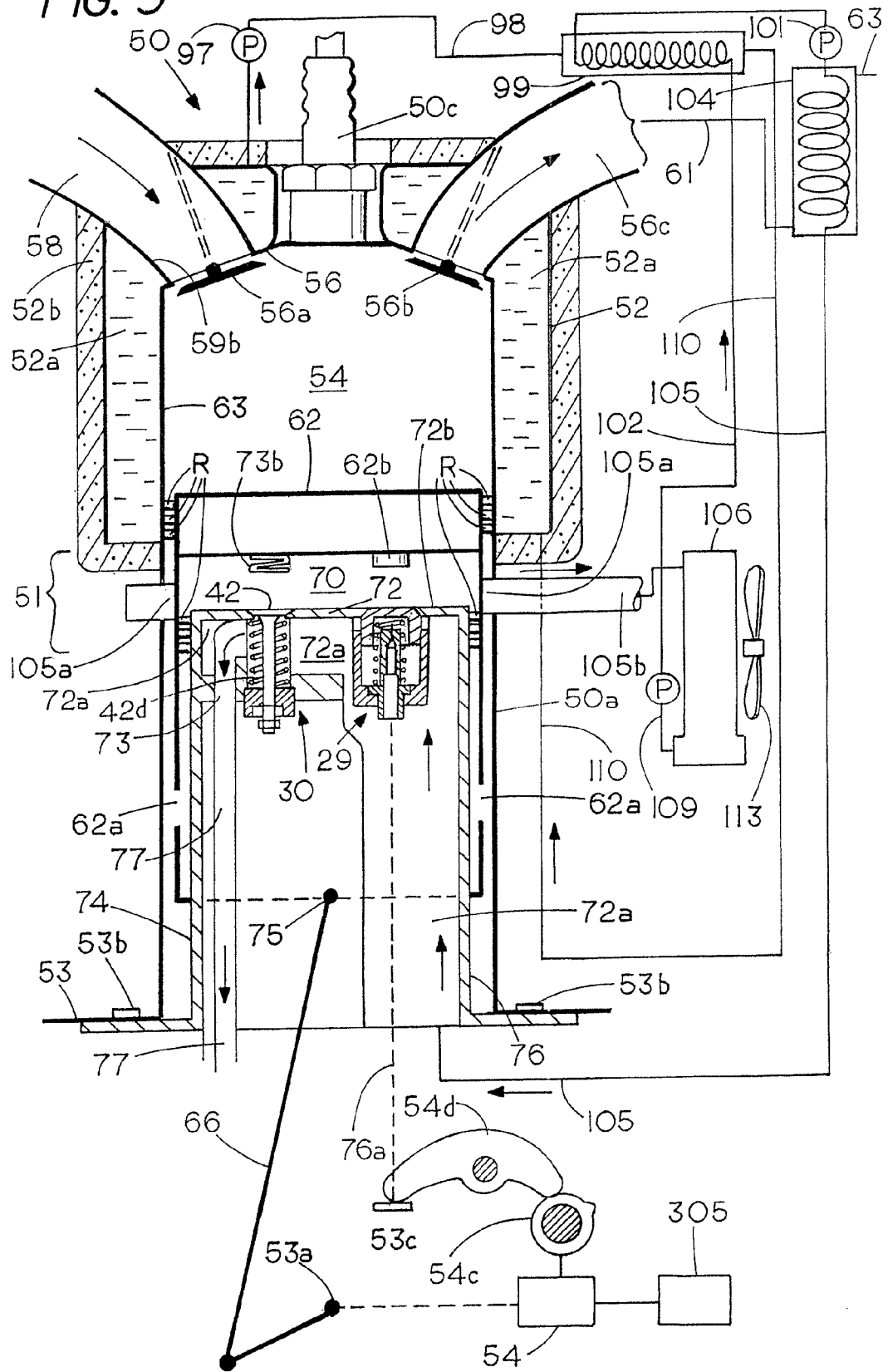
FIG. 9 is a diagrammatic vertical sectional view of a dual cycle internal combustion steam engine embodying the invention using steam power recovered from, waste heat.

Refer now to FIG. 9 which illustrates how the invention is applied as a steam expander in combination with an internal combustion engine to function as a dual cycle engine or internal combustion steam engine. In FIG. 9, the numeral 50 designates a high efficiency internal combustion dual cycle piston engine having an integral steam expander indicated generally by the numeral 51 including a steam expansion chamber 70 that furnishes supplemental power using superheated steam produced by waste heat from the combustion engine. The engine 50 has an engine block 50a with an outer cylinder head 56 and a spark plug 50c to function as a spark ignition gasoline engine operating on the Otto cycle and having a cooling jacket 52 containing a coolant 52a surrounding a combustion chamber 54. The engine crankcase 53 has a crankshaft 53a which is suitably coupled by a connecting rod 66 to a piston 62. The engine 50 can be a four stroke spark ignition engine, a diesel engine or, if desired, a two stroke cycle engine, Atkinson or other cycle engine. In the cylinder head 56 are mounted a combustion inlet valve 56a, an exhaust valve 56b which communicates with an intake pipe 58 and an exhaust pipe 56c. Valves 56a and 56b are actuated conventionally in any suitable manner as by push rods or camshaft (not shown). The piston 62 is mounted for reciprocation in the cylinder 63 and is sealed at its upper end conventionally by means of compression rings R located between the piston 62 and the cylinder 63 as well as between the piston 62 and an inner cylinder head or cap 72 having a flat upwardly directed top surface that defines the bottom wall of the steam expansion chamber 70. In the inside wall of a piston is machined and ground so as to be slidably and sealingly mounted on the inner cylinder cap 72 over the inner piston rings R so that the piston 62 is slidably and sealingly mounted with respect to both the cylinder 63 and the fixed steam cylinder cap or inner head 72. The piston 62 and head 72 can be as disclosed in copending application Ser. Nos. 12/075,042, 12/387,113 and 12/539,987, which are incorporated herein by reference. Throughout operation, steam is exhausted from the expansion chamber 70 in a primary exhaust phase when port openings 62a in the piston skirt only two of which are shown come into alignment with the exhaust ports 105a distributed circumferentially in a circular manifold around the cylinder 63 as described hereinabove in the aforesaid copending applications, Heat is recovered from the coolant 52a as described more fully in copending application Ser. No. 12/844,607, filed Jul. 27, 2010, which is incorporated herein by reference. An insulating cover layer 52b is provided around the cooling jacket 52.

The engine 50 is a double acting engine in which it will be noted that the steam expansion chamber 70 is located inside the piston 62 between the piston 62 and a cylinder cap 72 that comprises the inner or steam cylinder head. The cap 72 has a pair of laterally spaced apart legs 74 and 76 which serve as supports that are rigidly secured to the crankcase 53 by bolts 53b to provide a vertical slot between the legs to accommodate the wrist pin 75 as described in pending application Ser. No. 12/539,987. Steam is admitted to the steam expansion chamber 70 from a high pressure steam supply line 105 by a steam admission valve 29 as described above that can be opened by a valve lifter 62b similar to 25b but on the lower, i.e. inward, wall of the head of piston 62 or alternatively by a cam and camshaft 54c coupled by a valve rocker 54d to a retraction rod 76a. The phase of the camshaft 54c and the resulting cutoff of steam as a fraction of the stroke of piston 62 can be selected and regulated by a controller, e.g. an electronic engine management computer 305 and phase change gear box 54 as described in pending application Ser. No. 12/387,113 enabling phase change of valve 29 to be accomplished either mechanically or electronically to vary steam cutoff as a selected fraction of each stroke during operation.

The steam expander assembly 51 can be operated as described hereinabove and in pending provisional applications 61/309,640, filed Mar. 2, 2010, and 61/320,959, dated Apr. 5, 2010, which show how the residual steam is allowed to escape through a supplemental exhaust valve port 73 in FIG. 9 that closes at the end of the exhaust stroke so as to provide a zero steam compression condition, in this case, the pressure of a condenser 106. Also, the clearance space approximates zero at the lower end of its stroke as described hereinabove by having the piston 62 set to come virtually within a microscopic clearance, e.g. 020 inch, or other miniscule clearance from the head 72 that is just sufficient to prevent thermal expansion from allowing the piston to strike the head, thereby providing in effect, zero clearance with zero compression operation as described above and in provisional applications 61/320,959 and 61/309,640.

During operation, the coolant 52a is continuously circulated through the cooling jacket 52 by a pump 97 to a heat exchanger that transfers heat from the coolant to a working fluid such as water or binary working fluid or any other suitable aqueous or non-aqueous working fluid known to those skilled in the art for producing steam as described more fully in copending application Ser. No. 12/844,607, which is heated in a steam generator 104 by combustion exhaust gases expelled from the exhaust pipe 56c to produce superheated steam that is fed through steam pipe 105 into a steam chest 72a communicating with the normally closed steam admission valve 29. Valve 29 is opened during operation by the lifter 62b attached to the inner surface of the piston 62 in a manner similar to that as described above in connection with FIGS. 5-8 so as to inject high pressure steam from the steam chest 72a into the steam expansion chamber 70. The steam chest 72a as can be seen in FIG. 9 extends across the entire inner surface of the top wall 72b of the inner cylinder cap 72. The steam chest is therefore located inside of the inner cylinder head in thermal contact with an end wall adjacent the steam expansion chamber 70 for heating the steam expansion chamber inside of the piston. This reduces or eliminates power-robbing condensation during intermittent operation or low steam supply pressure.

The primary exhaust of steam takes place when the piston 62 approaches the top center position as openings 62a come into alignment with ports 105a so that most of the steam is expelled from expansion space 70 through steam exhaust pipe 105b when the piston reaches the end of its stroke. A secondary exhaust is provided by a normally open exhaust valve 30 described above which is yieldably biased to open position by a compression spring 42d so that when the piston 62 moves inwardly, the lifter 73b attached to the inner surface of the piston head will contact the exhaust valve 42 forcing it to a closed position just as the piston 62 reaches the bottom dead center position with its inner surface positioned an almost microscopic distance approximating a zero clearance, e.g. 020 inch from the upper surface of the inner cylinder head 72. Lifter 73b can be formed from a resilient material, such as helical compression spring or Belleville spring to keep valve 30 closed until steam is injected through valve 29.

In operation, high pressure steam from pipe 105 supplied via steam chest 72a through valve 29 is admitted into the steam expansion chamber 70 each time the lifter 62b contacts the valve 29 while at virtually at the same instant lifter 73b closes valve 30 so that the blast of steam injected into the clearance volume holds the valve 30 closed as the steam pressure drives the piston 62 upwardly until release through openings 62a allowing steam to be exhausted at 105b in the primary exhaust phase. As soon as cylinder pressure drops, the exhaust valve 30 opens responsive to the force of the helical compression opening spring 42d so that the steam expander 51 functions throughout operation as a zero clearance with zero compression expander to supplement the power produced by combustion using steam introduced through steam pipe 105 that has been provided by waste combustion heat. Residual steam passing out through exhaust valve 30 is expelled through an exhaust pipe 77, then together with the steam exhausted through the steam outlet pipe 105b it is sent to a condenser 106 and reheated to produce steam which is fed back through pipe 105 in an endless closed circuit.

During normal running of the engine, pipe 98 carries the coolant from jacket 52 and pump 97 into countercurrent heat exchanger 99. Pipe 110 then returns it back to cooling jacket 52. In a separate circuit, a vaporizable working fluid, such as water or water and ethylene glycol or other suitable known vaporizable aqueous or organic working fluid flows from heat exchanger 99 through a pressurizing pump 101 then to steam generator 104 which functions as a superheater that is fired by combustion exhaust gas discharged from the combustion exhaust pipe 56c through pipe 61 into steam generator 104 and exits through exhaust pipe 63 after superheating steam which flows from pump 101 through pipe 105 into steam chest 72a. The term "steam" herein is used broadly to include vapor from water as well as organic fluids or other suitable known working fluid. The steam generator 104 can comprise an enlarged combustion exhaust manifold for superheating the steam as described in the aforementioned copending applications. The coolant 52a is preferably a non-aqueous liquid, e.g. a mono or polyhydric alcohol or glycol preferably having a boiling point above 225° F. which is heated far above the boiling point of water to serve as a thermal interface between two different thermodynamic cycles of energy conversion, specifically, between an Otto or diesel cycle and the zero clearance with zero compression cycle as described in copending application Ser. No. 12/884,607, filed Jul. 27, 2010. One suitable coolant is anhydrous propylene glycol B.P. 375° F. which can be run continuously at 300° F. or above.

The coolant in heat exchanger 99 after dumping its heat load to the feed water is returned via pipe 110 to the cooling jacket 52.

The valves 29 and 30 as well as their lifters can be constructed and operated in accordance with any of the embodiments described herein. If a camshaft 54c, rocker and valve retractor 76a is used for operating the admission valve 29, the lifter 62b is unnecessary. The embodiment of FIG. 9 provides the advantage of more efficiently recovering waste heat energy than heretofore possible from an internal combustion engine which may lose about 60%-75% of the lower heating value of the fuel as waste heat. The invention thus makes feasible the prospect of an enormous saving in fuel since about 78% of the United States petroleum consumption is used for transportation.

In this way, efficiency of the z-z-cycle of the present invention can be carried over to the dual cycle application providing additional improvements of system efficiency. For example, in a combustion engine losing, say 65%, of the lower heating value of the fuel using the expander of FIG. 9 operating at a 28% thermal efficiency (FIG. 4), there is a potential of recovering 0.65×0.28=over 18% of the total heating value of the fuel, making possible an improvement of 50% or more in the power output of the engine through the use of the present invention.

Figure 10:
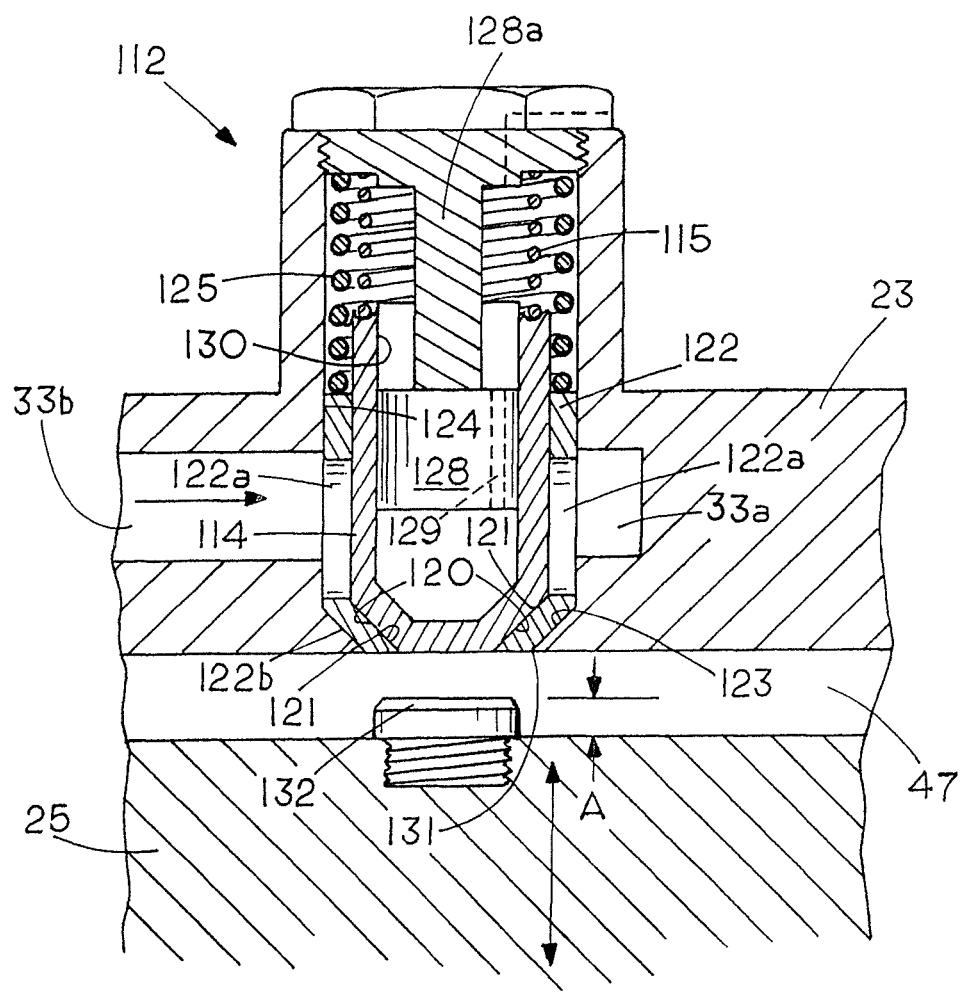
FIG. 10 is a partial vertical sectional view of a cylinder head and piston showing a modified form of steam admission valve for a zero clearance zero compression engine in accordance with the invention.

Another optional form of steam admission valve that can be used in place of valve 29 (FIG. 6) will now be described with reference to FIG. 10. The steam admission valve 112 has a cup-shaped core valve element 114 at its center that is forced downwardly by a compression spring 115 along the vertical central axis of valve 112. The core valve element 114 has a conical valve face 120 that is normally pressed by the spring 115 to form a seal with a cooperating inwardly facing conical valve seat 121 that surrounds a circular port through one end of an outer movable tubular valve element 122 slidably mounted concentrically over element 114 with a cylindrical outer wall that is slidably and sealably mounted in a bore 124 of the cylinder head 23 and is urged inwardly toward steam expansion chamber 47 by a compression spring 125 against conical seat 123 forming a positive seal 131 at the inner end of the bore 124. Valve 112 is therefore a duplex valve. Valve element 114 slides upon an enclosed plunger 128 that is fixed in place upon a support 128a within a cylindrical bore 130. The plunger 128 can be provided with a metering port 129 so that the plunger 128 functions as a pneumatic or hydraulic motion-retarding device to inhibit the motion of the valve element 114 when moving inwardly toward a closed position onto valve seat 121. It will be seen that both the valve seats 123 and 121 are slanted in a direction with their diameters increasing in an upward direction which enables steam to enter the cylinder through ports 122a in the sidewall of valve element 122 then pass between the valve elements 114 and 122 when core 114 is slid inwardly relative to valve element 122 and finally into clearance space 47 through the port in the lower end of element 122 as long as element 114 is off its seat. Secured rigidly to the piston 25 in alignment with the valve 112 is a bumper or valve lifter 132 that projects a predetermined distance A from the top surface of the piston 25 for opening valve 112. Instead of being located on the piston, a valve lifter or bumper can, of course, be a part of the valve itself.

The operation of valve 112 is as follows. When the piston 25 approaches the cylinder head 23, the lifter 132 makes contact with element 122 forcing it as well as the valve element 114 upwardly against the closing force of springs 115 and 125, but the valve 112 does not open during the first half of the cycle of contact between lifter 132 and the valve since the core element 114 remains in contact with seat 121. However, when the piston 25 closely approaches the cylinder head 23 providing a virtual zero clearance at the end of its stroke that may typically be about 0.020 inch (just enough to prevent the piston 14 from contacting the head 23 due to thermal expansion), the mechanical force exerted by the lifter 132 on valve 112 is then removed as it retreats away from the valve 112, and when the force is removed, valve element 122 will follow the lifter 132 remaining in contact with it due to the force of spring 125. By contrast, the core valve 114 is subject to very little inward, i.e. downward force owing to having no inner face subject to steam pressure as well as having a lighter seating spring 115, a greater mass than element 122 and being subject to the motion retarding effect of plunger 128 so that the inward movement of element 122 and the outward momentum of core element 114 imparted by lifter 132 will cause valve assembly 112 to pop open when the piston is at TDC just as the clearance space begins to expand.

Assuming valve lifter 132 contacts the valve through an arc of crank rotation totaling 6° (3° on either side of DC), valve element 122 will return to the its closed position as shown during the last 3° half of the contact cycle after dead center while the clearance space 47 is expanding but the core 114 which is held back and is slower to respond, as just described will, therefore, remain off of its seat 121 for a predetermined period of time allowing high pressure steam from supply duct 33b to flow between core valve 114 and element 122 filling the clearance space 47 as the clearance space expands, starting automatically when the piston changes direction yet without allowing steam to enter while the clearance volume 47 is contracting so as to prevent reverse torque as the clearance volume contracts. The valve assembly 112 is therefore able to utilize the full mass of the admitted steam to provide expansion work rather than filling an empty space so as to achieve maximum efficiency. The open period of the valve of FIG. 10, hence the cutoff of steam as a fraction of each power stroke can be controlled by the selection of at least three factors; the relative masses of the element 114 and element 122, the spring force acting on each and the retarding effect of the plunger 128. The mass of element 122 is most preferably less than 40% of core element 114.

In ordinary gas and steam engines, flow restriction (wire drawing) through partly opened valves as well as the delay caused by the need to accelerate the charge of steam can be partially offset by using a valve advance. A valve advance is effective in a standard engine because space is present into which the charge can flow from the valve. However, a zero clearance with zero compression engine by definition has virtually no clearance volume at TDC making valve advance ineffective especially here where the core valve 114 has enough momentum to open rapidly. Moreover, counter-torque due to opening the valve before dead center would produce a power loss.

At 3000 rpm a bump valve lifter attached to the piston crown may have an average velocity around seven feet per second when it contacts the valve. Here, the element 122 is provided with a strong spring 125 that will hold it in contact with the lifter 132 as the higher mass and lighter spring of the core valve element 114 enables momentum produced by the lifter 132 to open it quickly.

Figure 11:
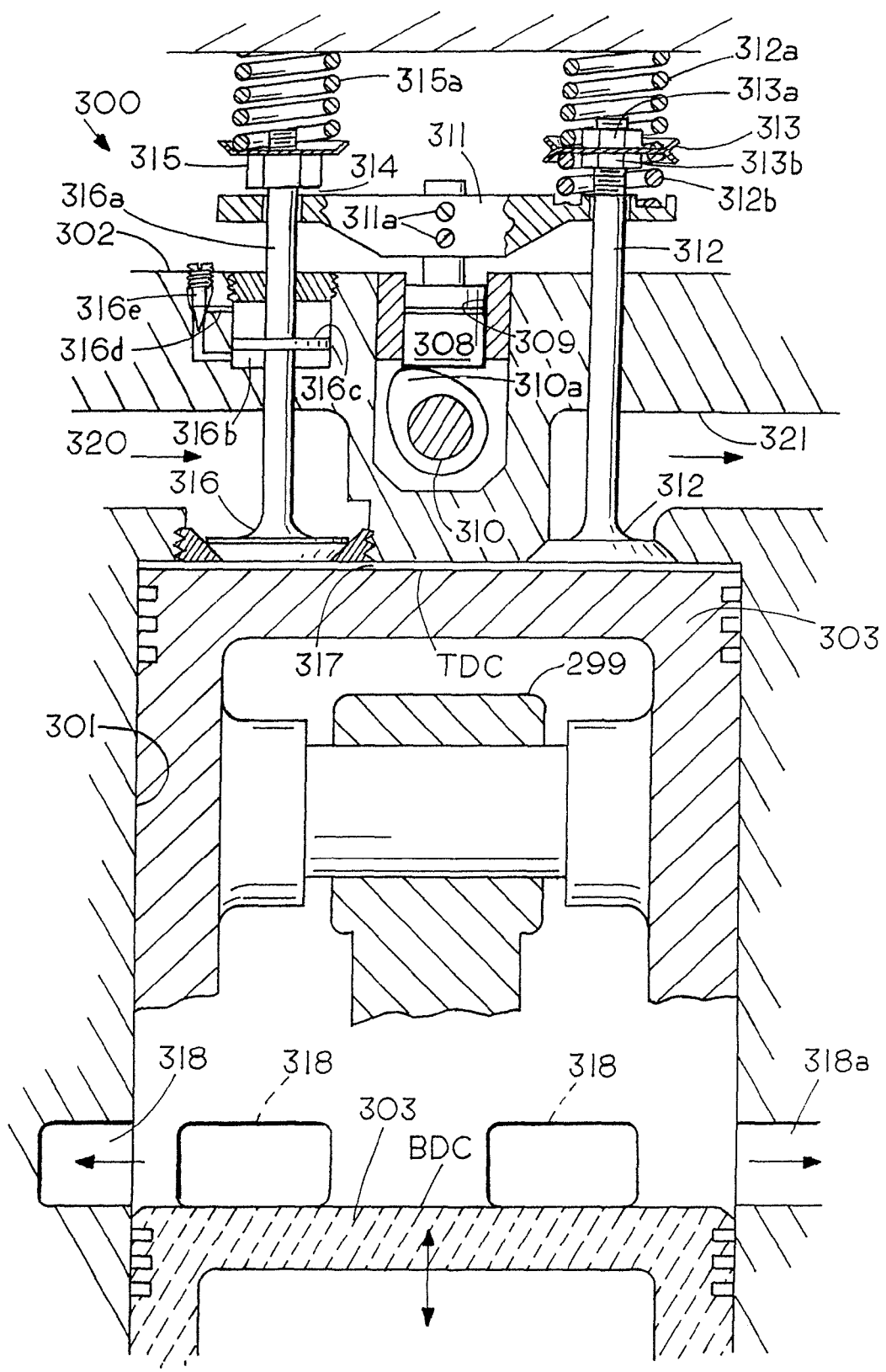
FIG. 11 is a partial vertical sectional view showing a cylinder head and piston with a modified form of admission and exhaust valve in accordance with the invention.

Refer now to FIG. 11 which illustrates another embodiment of the zero clearance with zero compression steam expander in which both a supplemental exhaust valve and the steam admission valve are operated by a single cam and single camshaft. The engine indicated at 300 has a cylinder 301 and cylinder head 302. In the cylinder 301 secured as in FIG. 5 to the crankshaft (not shown) by a connecting rod 299 is a piston 303 which is shown by solid lines in the top center position and by dashed lines in the bottom center position located slightly below automatic exhaust ports 318 that permit steam to be exhausted when the steam expansion chamber is at its maximum volume into an annular manifold with aligned ports then to exhaust pipe 318a as in FIGS. 5 and 6. Journaled for rotation in the cylinder head 302 is a camshaft 310 and cam in contact with a follower 308 mounted for reciprocating in the head within a guide 309. The camshaft 310 is driven by the crankshaft of the engine to run at the same speed as the crankshaft. Rigidly secured by set screws 311a to a post at the top of the follower is a bridge 311 with openings that slide over the stem 316a of steam admission valve 316 as well as a stem 312c of an auxiliary exhaust valve 312 which is shown just at the point of closing. On the stem of the admission valve 316 is threaded a timing nut 315 slightly above the bridge 311 to provide an optional gap 314. The admission valve 316 is normally held in the closed position by a compression spring 315a. The auxiliary exhaust valve 312 is normally held open about 0.19 inches by compression spring 312a. Near the end of the stem 312c of the exhaust valve 312 is a spring holder plate 313 held in place by nuts 313a and 313b. In between the spring holder plate 313 and the bridge 311 is a relatively stiff spring 313b. High pressure steam is admitted through a steam inlet passage 320 and steam is exhausted through primary exhaust 318a and through an auxiliary exhaust pipe 321.

The zero clearance zero compression engine 300 is operated by the single camshaft 310 in the following way. Near the end of each power stroke most of the steam is exhausted via cylinder ports 318 through the primary exhaust pipe 318a. Exhaust valve 312 is held in the open position by spring 312a after steam release through ports 318 while the admission valve spring 315a normally holds admission valve 316 in the closed position as shown in FIG. 11. However, when the lobe 310a of the cam raises the follower 308 as the piston approaches the head 302, the exhaust valve 312 is immediately closed by spring 312b which then continues to be compressed as the bridge rises holding valve 312 closed. As soon as the valve 312 is closed, the left end of the bridge 311 closes the gap 314 by engaging the timing adjustment nut 315 so as to open the admission valve 316 substantially simultaneous with the closing of the exhaust valve 312 thereby pressurizing the clearance volume 317 from which virtually all of the residual steam was exhausted through the supplemental exhaust pipe 321. The clearance at TDC can be 0.020 inch. The power stroke of the engine begins at the TDC position of the piston. Spring 312b holds valve 312 shut as gap 314 closes and valve 316 begins to open. After that, high pressure of the steam then admitted into the clearance space 317 continues to hold the exhaust valve 312 closed until the automatic exhaust valve 318 opens at release. The cam profile is set to allow the inlet valve 316 to close at a predetermined time that cuts off the flow of steam throughout a selected fraction of the power stroke following which valve 318 then opens automatically. The pressure drop at release through valve 318 will then allow the spring 312a to open the supplemental exhaust valve 312 and the cycle repeats.

As described thus far, this embodiment is suitable for a fixed cutoff which is useful in an engine that is designed to run on a constant speed and load, for example the battery charging module of a vehicle that is run on batteries but needs to be recharged like the General Motors Volt car. However, if it is desired to vary the cutoff of steam to the cylinder 301 selectively during the cycle, the valve 316 can be provided with a timing control chamber 316b that has compartments above and below plunger 316c which are connected through a duct 316d with a flow metering needle valve 316e for varying the rate the spring 315a is able to return the valve 316 to the seated position by regulating flow from the lower end of the timing control chamber to the upper end around the plunger 316c.

If desired, the relative timing of the valves can be set for closing of valve 312 and opening of valve 316 at the same instant or with a slight exhaust lead by first jacking the engine forward with exhaust valve 312 held shut until cam lobe 310a touches follower 308. The bridge 311 is then slid up on the post until it rests on the closing spring 312b and the setscrews 311a are then tightened. Nut 315 is then lowered by screwing it down while a feeler gauge is used to provide a 0.020 inch gap at 314. Nut 315 is then locked in place with a locknut (not shown). The 0.020 inch gap will allow about 9.3° rotation before the bridge 311 hits the timing adjustment nut 315 which at 2400 rpm is about $65 \times 10^{-5}$ seconds later; a period of time well within the meaning of the term "substantially simultaneous" as used herein. Also, without using a gap 314 both valves will be actuated without an intervening time period. With or without a gap 314, it will be understood that the valve assembly of FIG. 11 is highly effective in exhausting virtually all of the steam from a minute clearance space while substantially simultaneously admitting a fresh charge without impacting thermal efficiency from an engineering viewpoint as a result of losing admission mass directly to the exhaust outlet 321. The same is true with respect to the other embodiments described herein. It will be seen that one advantage of the embodiment shown in FIG. 11 is that a single cam 310 performs a closing as well as an opening function so that these operations can be made to occur as close together as desired to be certain that the exhaust closes without the possibility of losing steam mass as the admission valve opens. Operation therefore approximates zero clearance with an approximate zero compression. Cam operation although mechanically more complicated, has the advantage of being well-known reliable, highly developed and can also function with valve acceleration selected to reduce impact to the valves.

The valve operating mechanism of FIG. 11 can be also used in an inverted steam position within the inner cylinder cap 72 for operating both steam valves of the dual cycle engine of FIG. 9 with camshaft 310 located in a suitable position inside the crankcase 53

Many variations of the present invention within the scope of the appended claims will be apparent to those skilled in the art once the principles described herein are understood.

The invention claimed is:

1. A method of operating a steam expander of an engine having at least one cylinder, a cylinder head and a piston that is operatively connected to a crankshaft and is sealed in the cylinder for performing power strokes and return strokes, said method comprising the steps of:
   (a) providing a steam admission port in the cylinder head that is sealed by a steam admission valve which is located in the cylinder head port for controlling the admission of steam into a steam expansion chamber within the cylinder through the port,
   (b) providing an exhaust outlet for the cylinder that is sealed by an exhaust valve which is located in a cylinder exhaust outlet,
   (c) coupling the piston to the crankshaft so as to provide a clearance between the piston and the cylinder head which is reduced to a magnitude that is 8% or less of the stroke of the piston,
   (d) operating the exhaust valve by keeping the exhaust outlet open proximate an end of the return stroke for exhausting steam from the cylinder through the exhaust valve in the cylinder head,
   (e) utilizing steam pressure to apply an opening force to the steam admission valve that moves the steam admission valve to an open position due to the applied steam pressure, and
   (f) closing the exhaust valve and opening the steam admission valve to inject steam into the cylinder proximate a beginning of the power stroke for imparting rotation to the crankshaft.

2. The method of claim 1 including the steps of,
   first exhausting steam through an exhaust port and exhausting a remaining fraction of steam contained in the cylinder through the exhaust outlet.

3. The method of claim 1 wherein both said opening of the admission valve and closing of the exhaust valve is performed by engaging each valve with the piston or with one of a pair of laterally spaced apart lifters on the piston, with a lifter on each such valve or by providing an operative connection between at least one such valve and at least one cam.

4. The method of claim 1 including the steps of:
holding the admission valve open by momentarily maintaining a steam pressure differential thereacross, and
selecting a change in the pressure differential across the admission valve to control the fraction of the power stroke during which the inlet valve remains open.

5. A method of operating a steam expander for producing power in an engine having at least one cylinder, a piston sealingly and slidably mounted for reciprocation within the cylinder and operatively connected to a crankshaft, said method comprising the steps of:
providing a cylinder head that includes spaced apart steam inlet and steam exhaust valves that each has a valve head with a face located on an end wall of a steam expansion chamber and both valves communicate with the steam expansion chamber located between the piston and the cylinder head,
maintaining the exhaust valve open during at least a terminal part of an exhaust stroke of the piston,
providing a clearance between the piston and cylinder head of a magnitude that is about 8% or less of a stroke of the piston,
preventing contact between the piston and cylinder head while the steam in a clearance volume between the piston and the cylinder head is at a pressure established by the steam exhaust valve being open during the terminal part of the exhaust stroke of the piston such that the pressure in the clearance volume at a closing of the exhaust valve approximates ambient or condenser pressure, and
providing a transition from exhausting through said exhaust valve and an admission of steam through said admission valve by a bump force applied to each valve by piston contact proximate the terminal part of the exhaust stroke of the piston when the cylinder clearance is minimized.

6. The method of claim 5 including the step of:
actuating both of the valves by contact with the piston or a lifter on the piston or valve proximate the terminal part of the exhaust stroke of the piston.

7. The method of claim 5 including the step of opening the inlet valve and closing of the exhaust valve by engaging each valve with the piston or with one of a pair of laterally spaced apart lifters that are operatively associated between the piston and one such valve or by providing an operative connection between each such valve and at least one cam.

8. The method of claim 5 including the steps of:
holding the inlet valve open by momentarily maintaining a steam pressure differential thereacross, and
selecting a change in the pressure differential across the inlet valve to control the fraction of the power stroke during which the inlet valve remains open.

9. A method of operating a steam expander of an engine having at least one cylinder, a cylinder head, a piston sealingly and slidably mounted for reciprocation within the cylinder and operatively connected to a crankshaft, said method comprising the steps of:
providing a steam inlet valve comprising a valve body yieldable biased to a closed position and a steam exhaust valve that both communicate with a cylinder having a piston slidably mounted therein and a cylinder head at one end thereof defining a steam expansion chamber therebetween,
providing a clearance of about eight percent or less of the stroke between the piston and the cylinder head while determining a steam compression in the steam expansion chamber between the piston and the cylinder head by exhausting steam through the exhaust valve proximate an end of an exhaust stroke of the piston and the exhaust valve then being closed such that the steam compression in the steam expansion chamber before steam is injected does not exceed a pressure established by the exhaust valve being open proximate the end of the exhaust stroke of the piston,
locating a face of each valve on an end of the steam expansion chamber in the cylinder that is devoid of an empty recess that contributes substantially to a clearance volume and
providing a transition from exhausting through said exhaust valve and a steam admission through said admission valve without significant loss of an admission steam mass through the exhaust valve by closing the steam exhaust valve proximate an opening of the steam inlet valve.

10. The method of claim 9 and including the steps of:
providing a biphasic exhaust including:
(a) a preliminary steam exhaust from the cylinder proximate a maximum displacement of the steam expansion chamber, and
(b) providing an auxiliary steam exhaust by causing the exhaust valve to be open during at least a portion of a return stroke of the piston to thereby exhaust steam through the auxiliary steam exhaust that remains in the cylinder following the preliminary steam exhaust that occurs proximate maximum displacement.

11. The method of claim 9 including the step of:
actuating one or both of the valves by contact with the piston or by a lifter on the piston or valve at the end of a piston return stroke.

12. The method of claim 9 including the steps of:
closing the exhaust valve by a bump force applied by movement of the piston, and
holding the exhaust valve closed during at least a portion of the power stroke by a charge of steam admitted into the cylinder through said admission valve that applies pressure to the exhaust valve.

13. The method of claim 9 including the step of:
providing a steam cutoff timing control for selecting a fraction of the power stroke of the piston during which steam is admitted into the cylinder through the steam inlet valve.

14. The method of claim 9 including the step of:
facilitating the opening of the inlet valve by applying a steam power assist thereto to drive the inlet valve open due to the force of steam applied thereto from a steam supply that is used to run the engine.

15. The method of claim 9 including the steps of:
operating said steam expander as an expander of a dual cycle internal combustion steam engine, and
burning fuel in a combustion chamber thereof that produces exhaust gases which fires a heater for heating the steam supplied to the steam expansion chamber.

16. The method of claim 9 including the step of:
providing an electronic engine control that is operatively connected to the steam inlet valve for varying the cutoff of steam flowing into the steam expansion chamber during power strokes of the engine while the engine is in operation.

17. The method of claim 16 including the steps of providing an electrical solenoid and
operatively associating the electrical solenoid with the steam admission valve.

18. The method of claim 17 including the step of providing an operative association between the steam admission valve and the piston to initiate opening the steam admission valve by a force applied thereto by piston contact.

19. A method of operating a steam expander for producing power in an engine having at least one cylinder, a piston sealingly and slidably mounted for reciprocation within the cylinder and operatively connected to a crankshaft, said method comprising the steps of:
   providing a cylinder head that includes spaced apart steam inlet and steam exhaust valves located on an end wall of a steam expansion chamber and both valves communicate with a steam expansion chamber located between the piston and the cylinder head,
   maintaining the exhaust valve open during at least a terminal part of an exhaust stroke of the piston,
   providing a clearance between the piston and cylinder head of a magnitude that is about 8% or less of a stroke of the piston,
   preventing contact between the piston and cylinder head while the steam in a clearance volume between the piston and the cylinder head is at a pressure established by the steam exhaust valve being open during the terminal part of the exhaust stroke of the piston such that the pressure in the clearance volume at a closing of the exhaust valve approximates ambient or condenser pressure, and
   providing a transition from exhausting through said exhaust valve and an admission of steam through said admission valve by a bump force applied to each valve by piston contact proximate termination of the exhaust stroke of the piston when the cylinder clearance is minimized and including the step of:
      facilitating the actuation of the admission valve by applying a steam power assist to the admission valve to open the admission valve by the force of the steam applied thereto from a steam supply that is used to run the engine.

20. A method of operating a steam expander for producing power in an engine having at least one cylinder, a piston sealingly and slidably mounted for reciprocation within the cylinder and operatively connected to a crankshaft, said method comprising the steps of:
   providing a cylinder head that includes spaced apart steam inlet and steam exhaust valves located on an end wall of the steam expansion chamber and both valves communicate with a steam expansion chamber located between the piston and the cylinder head,
   maintaining the exhaust valve open during at least a terminal part of an exhaust stroke of the piston,
   providing a clearance between the piston and cylinder head of a magnitude that is less about 8% of a stroke of the piston,
   preventing contact between the piston and cylinder head while the steam in a clearance volume between the piston and the cylinder head is at a pressure established by the steam exhaust valve being open during the terminal part of the exhaust stroke of the piston such that the pressure in the clearance volume at a closing of the exhaust valve approximates ambient or condenser pressure,
   providing a transition from exhausting through said exhaust valve and an admission of steam through said admission valve by a bump force applied to each valve by piston contact proximate the terminal part of the exhaust stroke of the piston when the cylinder clearance is minimized, and
   providing the steam expander as a part of a dual cycle internal combustion steam engine having at least one combustion chamber therein for burning fuel and a combustion exhaust port connected for providing exhaust gasses to fire a heater for steam that is supplied to the steam expansion chamber of the engine.

21. A method of operating a steam expander of an engine having at least one cylinder, a cylinder head, a piston sealingly and slidably mounted for reciprocation within the cylinder and operatively connected to a crankshaft, said method comprising the steps of:
   providing a steam inlet valve comprising a valve body yieldable biased to a closed position and a steam exhaust valve that both communicate with a cylinder having a piston slidably mounted therein and a cylinder head at one end thereof,
   providing a clearance of about eight percent or less of the stroke between the piston and the cylinder head while determining a steam compression in an expansion chamber between the piston and the cylinder head by exhausting steam through the exhaust valve proximate an end of an exhaust stroke of the piston and the exhaust valve then being closed such that the steam compression in the expansion chamber before steam is injected does not exceed a pressure established by the exhaust valve being open proximate the end of the exhaust stroke of the piston,
   providing a transition from exhausting through said exhaust valve and a steam admission through said admission valve without significant loss of an admission steam mass through the exhaust valve by closing the steam exhaust valve proximate an opening of the steam inlet valve,
   providing a valve face on a free end surface of the inlet valve,
   sealingly mounting the inlet valve in a bore having a compartment in communication with the inlet valve,
   momentarily holding the inlet valve open by steam pressure applied to the valve face thereof, and
   providing a steam admission timing control by selecting a flow of steam into the compartment communicating with the inlet valve for regulating a fraction of the power stroke of the piston during which steam is admitted through said inlet valve.

22. The method of claim 21 including the steps of:
   yieldably biasing the inlet valve to a closed position,
   causing steam pressure in the compartment communicating with the inlet valve to fall to ambient or exhaust pressure during exhaust, and
   adjusting a flow of steam into the compartment to regulate the rate of change in the steam pressure differential across the inlet valve to control the fraction of the power stroke that the inlet valve remains open.

23. A method of operating a steam expander of an engine having at least one cylinder, a cylinder head and a piston that is operatively connected to a crankshaft and is sealed in the cylinder for performing a power stroke and a return stroke, said method comprising the steps of:
   (a) providing a steam admission port in the cylinder head that is sealed by a steam admission valve which is located within a bore in the cylinder head so as to open in a direction away from a steam expansion chamber for controlling the admission of supply steam into the steam expansion chamber within the cylinder through the steam admission port and allowing pressure in the bore on an opposite side of steam admission valve from the steam admission port in the cylinder to fall after each power stroke such that the steam supplied thereto establishes is a pressure differential across the steam admission valve that forces the admission valve open by steam pressure applied thereto,
(b) providing an exhaust outlet communicating with the expansion chamber that is sealed by an exhaust valve which is located in the exhaust outlet,
(c) coupling the piston to the crankshaft so as to provide a clearance between the piston and a cylinder head that is no greater than about 8% of a maximum clearance between the cylinder head and the piston,
(d) operating the exhaust valve to keep the exhaust outlet open during at least a portion of the return stroke for exhausting steam from the cylinder,
(e) providing the clearance between the cylinder head and the piston at a minimum and the piston proximate an end of the piston return stroke while the exhaust valve is open and
(f) closing the exhaust valve and opening the steam admission valve to inject steam into the clearance between the cylinder head and the piston proximate a beginning of the power stroke to thereby power the engine and impart rotation to the crankshaft.

24. The method of claim 23 including the steps of:
exhausting steam through a preliminary exhaust orifice that communicates with the interior of the cylinder, and
placing the exhaust outlet on a surface of the expansion chamber at one end of the expansion chamber and a face of the exhaust valve in the exhaust outlet for exhausting steam remaining in the cylinder through the exhaust outlet.

25. The method of claim 23 wherein both said opening of the admission valve and closing of the exhaust valve is performed by engaging each valve with the piston or with a lifter on the piston or valve or by an operative connection between each valve and a camshaft.

26. The method of claim 23 including the steps of:
providing as said admission valve a normally closed valve that opens when moved away from the expansion chamber,
providing as said exhaust valve a normally open valve that closes when moved away from the expansion chamber, and
closing the exhaust valve and opening the admission valve by engagement of the valves with the piston or a lifter on the piston or valve when the piston is proximate an end of the return stroke.

27. The method of claim 23 including the steps of:
yieldably biasing said exhaust valve to an open position toward the expansion chamber, and
maintaining the exhaust valve closed during at least part of the power stroke by the force of steam thereon that is admitted into the cylinder through said admission valve.

28. The method of claim 23 including the steps of:
connecting a spring to the piston to act as a lifter at a top end of the piston;
positioning a free end of the spring or a cover over the spring for contact with the exhaust valve;
causing the spring to become compressed in response to contact with the exhaust valve as the clearance volume contracts such that the spring or cover become recessed into a pocket in a top surface of the piston; and
thereby holding the exhaust valve closed by means of the spring as steam is injected into the clearance volume through the admission valve.

29. The method of claim 23 including the steps of:
yieldably biasing the admission valve toward the clearance volume to assume a closed position with a closing force that is independent of the steam supply pressure; and
causing the admission valve to open when the piston is proximate an end of the return stroke for injecting steam into the clearance volume.

30. The method of claim 23, including the step of,
causing the admission valve to open responsive to movement thereof by the piston, a lifter on the piston, an electromagnet or a camshaft.

31. The method of claim 23 including the steps of:
providing an exposed valve face on a free end surface of each valve, and
maintaining each of the valve faces when closed in close proximity to an opposing engine surface when the engine surface approaches each valve to minimize the clearance volume between the cylinder head and the confronting engine surface.

32. The method of claim 23 including the step of:
approximating a termination of exhausting through the exhaust valve while initiating steam admission through the admission valve.

33. The method as in any of claim 9, 23, 5, or 1 wherein the clearance is less than about 0.080 inch.

34. A steam expander of an engine comprising:
at least one cylinder having a cylinder head and a piston that is slidably and sealingly mounted in the cylinder and is operatively connected to a crankshaft for imparting rotation to the crankshaft,
a steam admission valve body having a sidewall slidably mounted in a bore having a compartment on a first side of an admission valve, the admission valve being operatively associated with the cylinder for admitting steam into a steam expansion chamber located in the cylinder on a second side of the admission valve between the piston and the cylinder head and an aperture radially outward of the steam admission valve body sidewall to apply steam pressure to the sidewall when the admission valve is closed and thereafter when partially open applying steam pressure to an end thereof that forces the admission valve open,
an exhaust valve operatively associated with the cylinder for exhausting steam from the steam expansion chamber,
an operative connection between the piston and the crankshaft that maintains a clearance between the cylinder head and the piston at about 8% or less of the clearance at maximum displacement, and
an exhaust valve mechanism element for opening the exhaust valve that is operatively associated with the exhaust valve so as to exhaust steam from the cylinder through the exhaust valve during a portion of each return stroke of the piston within the cylinder, and
a member for shutting the exhaust valve proximate an end of each exhaust stroke for reducing compression of residual steam remaining within a clearance volume.

35. The steam expander according to claim 34 wherein an operating element for opening the admission valve or said actuator for closing the exhaust valve is the piston or a lifter mounted on the piston or on one of the valves.

36. The steam expander according to claim 34 wherein an operating element for the admission valve or actuator for the exhaust valve includes a camshaft and at least one cam or an electrical solenoid that is operatively associated with at least one such valve for the operation thereof at timed intervals.

37. The steam expander according to claim 34 wherein the steam expander comprises a steam expander as a part of a dual cycle internal combustion steam engine.

38. The steam expander according to claim 37 wherein steam is supplied to a steam chest located inside of the cylinder head in thermal transfer contact across an end wall adjacent the steam expansion chamber for heating the steam expansion chamber.

39. The steam expander according to claim 34 wherein a camshaft is connected to the crankshaft, at least one follower is connected to engage a cam on the camshaft that imparts a closing movement to the exhaust valve and imparts an opening movement to the steam admission valve proximate the end of the return stroke of the piston.

40. The steam expander according to claim 34 wherein the admission valve is constructed and arranged to enable the pressure in the bore on the first side of the admission valve to fall during exhaust and prevent steam pressure of a steam supply from exerting an axial force thereon before opening but thereafter to exert an axial force on the second side of the valve that slides the admission valve to a fully open position due to the force of the applied steam.

41. The steam expander according to claim 34 wherein the admission valve has a self-contained timing control for establishing the period of time that the admission valve remains open during a cycle of operation of the engine to thereby regulate the cutoff of steam to the cylinder during each power stroke thereof.

42. A steam expander of an engine comprising:
at least one cylinder having a cylinder head and a piston that is slidably and sealingly mounted in the cylinder and is operatively connected to a crankshaft for imparting rotation to the crankshaft,
a steam admission valve in a bore having a compartment on a first side of the steam admission valve, the steam admission valve being operatively associated with the cylinder for admitting steam into a steam expansion chamber located in the cylinder on a second side of the admission valve between the piston and the cylinder head,
an exhaust valve operatively associated with the cylinder for exhausting steam from the steam expansion chamber,
an operative connection between the piston and the crankshaft that maintains a clearance between the cylinder head and the piston at about 8% or less of the clearance at maximum displacement,
an exhaust valve mechanism element for opening the exhaust valve that is operatively associated with the exhaust valve so as to exhaust steam from the cylinder through the exhaust valve during a portion of each return stroke of the piston within the cylinder, and
a member for shutting the exhaust valve proximate an end of each exhaust stroke for reducing compression of residual steam remaining within a clearance volume, and
wherein the steam admission valve is opened by the piston or a lifter operatively associated therewith, and
wherein a timing delay element is operatively associated with the admission valve to reduce or eliminate power loss due to reverse torque caused by a premature opening thereof while the clearance volume is contracting.

43. The steam expander of claim 42 wherein the timing delay element is a circular rim that is part of a bore holding the admission valve adjacent a steam supply chamber and the rim forms a seal with a cylindrical sidewall of the admission valve until the admission valve clears the rim thereby allowing steam to enter the steam expansion chamber from the supply chamber.

44. A steam expander of an engine comprising:
at least one cylinder having a cylinder head and a piston that is slidably and sealingly mounted in the cylinder and is operatively connected to a crankshaft for imparting rotation to the crankshaft,
a steam admission valve in a bore having a compartment on a first side of the steam admission valve, the steam admission valve being operatively associated with the cylinder for admitting steam into a steam expansion chamber located in the cylinder on a second side of the admission valve between the piston and the cylinder head,
an exhaust valve operatively associated with the cylinder for exhausting steam from the steam expansion chamber,
an operative connection between the piston and the crankshaft that maintains a clearance between the cylinder head and the piston at about 8% or less of the clearance at maximum displacement,
an exhaust valve mechanism element for opening the exhaust valve that is operatively associated with the exhaust valve so as to exhaust steam from the cylinder through the exhaust valve during a portion of each return stroke of the piston within the cylinder, and
a member for shutting the exhaust valve proximate an end of each exhaust stroke for reducing compression of residual steam remaining within a clearance volume,
wherein the steam admission valve further comprises:
an axially movable poppet valve element, and
a metering valve connected for adjusting a rate of flow for steam flowing from the steam expansion chamber to the compartment in the bore to thereby achieve a desired timing to regulate the cutoff of steam by the valve element to the steam expansion chamber.

45. A steam expander of an engine comprising:
at least one cylinder, a cylinder head and a piston that is slidably and sealingly mounted in the cylinder and is operatively connected to a crankshaft for imparting rotation to the crankshaft,
a steam admission valve operatively associated with the cylinder for admitting steam into a steam expansion chamber located in the cylinder between the piston and the cylinder head,
an exhaust valve operatively associated with the cylinder for exhausting steam from the steam expansion chamber,
wherein the admission valve is a poppet valve comprising a poppet piston having a cylindrical sidewall slidably and sealingly enclosed within a cylindrical bore that terminates in a valve seat and the poppet piston is yieldably biased toward a closed position against the valve seat in the engine at one end of the bore, the poppet piston having a valve face that extends centrally from the sidewall thereof and also extends centrally from a wall of the bore to form a seal against the seat when the admission valve is closed, and
a steam supply chamber in the engine communicating between the bore and a steam supply,
such that with the poppet piston in the closed position steam in the supply chamber is unable to apply an axial force on the poppet piston but when the valve is at least partially open steam from the supply chamber is able to flow into the bore between the face of the poppet piston and the steam expansion chamber to thereby create a pressure differential across the poppet piston that exerts an axial lifting force on the poppet piston which slides the poppet piston open by means of the lifting force of the steam to a more fully open position.

46. A steam expander of an engine comprising:

at least one cylinder having a cylinder head and a piston that is slidably and sealingly mounted in the cylinder and is operatively connected to a crankshaft for imparting rotation to the crankshaft, a steam admission valve having a face located in a wall of the cylinder head that forms an end of the cylinder so as to confront the piston for injecting steam into a steam expansion chamber located in the cylinder between the piston and the cylinder head, an admission valve mechanism element for opening the admission valve that admits steam into the cylinder proximate the beginning of a power stroke of the piston, an exhaust valve having a valve end face in a wall of the expansion chamber for exhausting steam from the steam expansion chamber during an exhaust stroke; wherein the exhaust valve is open during a substantial part of each exhaust stroke, an exhaust valve mechanism element for closing the exhaust valve exhaust valve when the admission valve opens proximate an end of each exhaust stroke such that any compression at the end of the exhaust stroke is substantially compression due to a closing of the exhaust valve that is able to trap a remaining residual fraction of the initial steam mass which was not exhausted, wherein the operative connection between the piston and the crankshaft establishes a clearance between the piston and the cylinder head to be at a minimum during a transition from exhaust to admission and about 8% or less of the clearance at the beginning of said exhaust stroke, and wherein a clearance volume of the steam expansion chamber is devoid of an empty recess that contributes substantially to the clearance volume.

47. The steam expander according to claim 46 wherein the admission valve opener comprises the piston or a lifter operatively associated between piston and the admission valve.

48. The steam expander according to claim 46 including a passage communicating with the steam supply that opens the admission valve due to the force of applied steam pressure thereto from steam supplied to the engine.

49. The steam expander according to claim 46 wherein the admission valve is unseated by an opening force applied thereto, steam is supplied to the admission valve through an aperture, and the admission valve comprises a poppet piston valve constructed and slidably arranged within a bore that contains the steam supply aperture such that the opening force is due to steam applied to the admission valve and an application of the opening force is independent of the steam pressure supplied to the admission valve.

50. A steam expander of an engine comprising:

at least one cylinder having a cylinder head and a piston that is slidably and sealingly mounted in the cylinder and is operatively connected to a crankshaft for imparting rotation to the crankshaft, a steam admission valve located in the cylinder head so as to confront the piston for injecting steam into a steam expansion chamber located in the cylinder between the piston and the cylinder head, an admission valve mechanism element for opening the admission valve that admits steam into the cylinder proximate the beginning of a power stroke of the piston, an exhaust valve mechanism having an exhaust valve that is open during a substantial part of each exhaust stroke, an exhaust valve mechanism element for closing the exhaust valve when the admission valve opens proximate an end of each exhaust stroke such that any compression at the end of the exhaust stroke is substantially compression due to the closing of the exhaust valve that is able to trap a remaining residual fraction of the initial steam mass which was not exhausted, wherein an operative connection between the piston and the crankshaft establishes a clearance between the piston and the cylinder head to be at a minimum during a transition from exhaust to admission and about 8% or less of the clearance at a beginning of said exhaust stroke, wherein a clearance volume of the steam expansion chamber is devoid of an empty recess that contributes substantially to the clearance volume; and wherein the admission valve includes a delay element that retards the opening thereof after the admission valve leaves a valve seat while the piston is still approaching an end of each steam exhaust stroke.

51. The steam expander of claim 50, wherein the delay element is a rim that extends axially from an inlet valve seat and is slidably related to a sidewall of the admission valve to thereby open when the admission valve clears the rim.

52. A steam expander of an engine comprising:

at least one cylinder having a cylinder head and a piston that is slidably and sealingly mounted in the cylinder and is operatively connected to a crankshaft for imparting rotation to the crankshaft, a steam admission valve having a face-located in a wall of the cylinder head that forms an end of the cylinder so as to confront the piston for injecting steam into a steam expansion chamber located in the cylinder between the piston and the cylinder head, an admission valve mechanism element for opening the admission valve that admits steam into the cylinder proximate the beginning of a power stroke of the piston, an exhaust valve having a valve end face in a wall of the expansion chamber for exhausting steam from the steam expansion chamber during an exhaust stroke; wherein the exhaust valve is open during a substantial part of each exhaust stroke, an exhaust valve mechanism element for closing the exhaust valve when the admission valve opens proximate an end of each exhaust stroke such that any compression at the end of the exhaust stroke is substantially compression due to a closing of the exhaust valve that is able to trap a remaining residual fraction of the initial steam mass which was not exhausted, wherein the operative connection between the piston and the crankshaft establishes a clearance between the piston and the cylinder head to be at a minimum during a transition from exhaust to admission and about 8% or less of a clearance at a beginning of said exhaust stroke, wherein a clearance volume of the steam expansion chamber is devoid of an empty recess that contributes substantially to the clearance volume; and wherein a control member is operatively associated with the steam admission valve to time the closing thereof.

53. The steam expander as in any of claim 45, 46, or 52 wherein the clearance is less than about 0.080 inch.

54. A steam expander of an engine comprising:
at least one cylinder, a cylinder head and a piston that is slidably and sealingly mounted in the cylinder and is operatively connected to a crankshaft for imparting rotation to the crankshaft,
a steam admission valve operatively associated with the cylinder for admitting steam into a steam expansion chamber located in the cylinder between the piston and the cylinder head,
an exhaust valve operatively associated with the cylinder for exhausting steam from the steam expansion chamber,
wherein the admission valve is a poppet valve comprising a poppet piston having a cylindrical sidewall slidably and sealingly enclosed within a cylindrical bore that terminates in a valve seat and the poppet piston is yieldably biased toward a closed position against the valve seat in the engine at one end of the bore, the poppet piston having a valve face that extends centrally from the sidewall to form a seal against the seat when the admission valve is closed, and
a steam supply chamber in the engine communicating between the bore and a steam supply,
such that with the poppet piston in the closed position steam in the supply chamber is unable to apply an axial force on the poppet piston but when the valve is at least partially open steam from the supply chamber is able to flow into the bore between the face of the poppet piston and the steam expansion chamber to thereby create a pressure differential across the poppet piston that exerts an axial lifting force on the poppet piston which slides the poppet piston open by means of the lifting force of the steam to a more fully open position and
wherein the admission valve includes a delay element that retards the opening thereof when the valve face leaves the valve seat as the piston approaches the end of a return stroke.

55. The steam expander of claim 54 wherein the delay element is a rim as a part of the bore, the rim being located between the steam supply chamber and the admission valve seat to seal the admission valve until the valve face clears the rim so as to then enable steam to flow between the valve face and the seat into the cylinder.

56. A steam expander of an engine comprising:
at least one cylinder having a cylinder head and a piston that is slidably and sealingly mounted in the cylinder and is operatively connected to a crankshaft for imparting rotation to the crankshaft,
a steam admission valve located in the cylinder head for injecting steam into a steam expansion chamber located in the cylinder between the piston and the cylinder head,
an admission valve mechanism element for opening the admission valve that admits steam into the cylinder proximate the beginning of a power stroke of the piston,
an exhaust valve having a valve end face in a wall of the expansion chamber for exhausting steam from the steam expansion chamber during an exhaust stroke;
an exhaust valve mechanism element that holds the exhaust valve open during a substantial part of each exhaust stroke,
a member that closes the exhaust valve when the admission valve opens proximate dead center at an end of each exhaust stroke such that any compression at the end of each exhaust stroke is substantially compression due to the closing of the exhaust valve that is able to trap a remaining residual fraction of the initial steam mass,
wherein an operative connection between the piston and the crankshaft establishes a clearance between the piston and the cylinder head to be at a minimum during a transition from exhaust to admission and about 8% or less of the clearance at a beginning of said exhaust stroke,
wherein a clearance volume of the steam expansion chamber is devoid of an empty recess that contributes substantially to the clearance volume; and
wherein the admission valve has a timing control including a metering valve connected to control a pressure differential across the admission valve for establishing a closing time for the admission valve.

57. The expander of claim 56 wherein the engine is a multicylinder engine having one of the metering valves for each cylinder, the timing control includes a control member for positioning each such metering valve as the control member sets the closing time of each such admission valve.

58. A steam expander of an engine comprising:
at least one cylinder having a cylinder head and a piston that is slidably and sealingly mounted in the cylinder and is operatively connected to a crankshaft for imparting rotation to the crankshaft,
a steam admission valve in a bore having a compartment on a first side of the steam admission valve, the steam admission valve being operatively associated with the cylinder for admitting steam into a steam expansion chamber located in the cylinder on a second side of the admission valve between the piston and the cylinder head,
an exhaust valve operatively associated with the cylinder for exhausting steam from the steam expansion chamber,
an operative connection between the piston and the crankshaft that maintains a clearance between the cylinder head and the piston at about 8% or less of the clearance at maximum displacement,
an exhaust valve mechanism element for opening the exhaust valve that is operatively associated with the exhaust valve so as to exhaust steam from the cylinder through the exhaust valve during a portion of each return stroke of the piston within the cylinder, and
a member for shutting the exhaust valve proximate an end of each exhaust stroke for reducing compression of residual steam remaining within a clearance,
wherein the steam admission valve is a duplex poppet valve which further comprises:
an outer valve element having a tubular sidewall and at one end thereof a first circular valve seat therefor surrounds a steam admission port to the engine cylinder, and
a core valve element slidably mounted therein for engaging a second circular seat between the core element and the outer valve element to control steam flow therethrough, a valve actuator is the piston or a lifter for raising the outer element from its seat and the duplex valve has an opening to allow steam to flow from a steam supply chamber communicating with the duplex valve into the engine cylinder when the duplex valve is opened by the piston or the lifter.

59. A steam expander of an engine comprising:
at least one cylinder, a cylinder head and a piston that is slidably and sealingly mounted in the cylinder and is operatively connected to a crankshaft for imparting rotation to the crankshaft, a steam admission valve operatively associated with the cylinder for admitting steam into a steam expansion chamber located in the cylinder between the piston and the cylinder head, an exhaust valve operatively associated with the cylinder for exhausting steam from the steam expansion chamber, wherein the admission valve is a poppet valve comprising a poppet piston having a cylindrical sidewall slidably and sealingly enclosed within a cylindrical bore that terminates in a valve seat and the poppet piston is yieldably biased toward a closed position against the valve seat in the engine at one end of the bore, the poppet piston having a valve face that extends centrally from the sidewall to form a seal against the seat when the admission valve is closed, and a steam supply chamber in the engine communicating between the bore and a steam supply, such that with the poppet piston in the closed position steam in the supply chamber is unable to apply an axial force on the poppet piston but when the valve is at least partially open steam from the supply chamber is able to flow into the bore between the face of the poppet piston and the steam expansion chamber to thereby create a pressure differential across the poppet piston that exerts an axial lifting force on the poppet piston which slides the poppet piston open by means of the lifting force of the steam to a more fully open position and wherein the poppet piston is connected to a control for establishing the closing time of the poppet piston, said control comprising at least one fluid-containing compartment operatively related to the poppet piston and a metering member for determining the flow of a fluid into or out of the compartment.

60. The expander of claim 59 wherein the poppet piston has a duct therein communicating through the admission port between the steam expansion chamber and the fluid-containing compartment, the fluid comprises steam and the metering member comprises a metering valve operatively associated between the duct in the poppet piston and the compartment such that the metering valve can be adjusted to vary the flow of steam to or from the compartment for regulating the cutoff of steam supplied through the steam admission valve to the expander.

61. A steam expander of an engine comprising:
at least one cylinder having a cylinder head and a piston that is slidably and sealingly mounted in the cylinder and is operatively connected to a crankshaft for imparting rotation to the crankshaft, a steam admission valve mounted within a bore having a compartment on a first side of the steam admission valve, the steam admission valve being operatively associated with the cylinder for admitting steam into a steam expansion chamber located in the cylinder on a second side of the steam admission valve between the piston and the cylinder head, an exhaust valve operatively associated with the cylinder for exhausting steam from the steam expansion chamber, an operative connection between the piston and the crankshaft that maintains a clearance between the cylinder head and the piston at about 8% or less of the clearance at maximum displacement, an exhaust valve mechanism element for opening the exhaust valve that is operatively associated with the exhaust valve so as to exhaust steam from the cylinder through the exhaust valve during a portion of each return stroke of the piston within the cylinder, and a member for shutting the exhaust valve proximate an end of each exhaust stroke for reducing compression of residual steam remaining within a clearance volume, wherein the steam admission valve further comprises a poppet piston valve with a cylindrical sidewall that is slidable to an open position in the bore so as to communicate with a steam chest through an aperture in a sidewall of the bore when the admission valve is open, wherein the poppet piston valve has a sealing surface at one end of the cylindrical sidewall of the poppet piston valve, and wherein said sealing surface on the poppet piston valve forms a seal against a valve seat which communicates with a port in the steam expansion chamber, such that the steam chest communicates with the valve bore through the aperture in the bore when the poppet piston valve is moved axially off of the seat for admitting steam from the steam chest into the steam expansion chamber of the engine.

62. A steam expander of an engine comprising:
at least one cylinder having a cylinder head and a piston that is slidably and sealingly mounted in the cylinder and is operatively connected to a crankshaft for imparting rotation to the crankshaft, a steam admission valve having a face located in a wall of the cylinder head that forms an end of the cylinder so as to confront the piston for injecting steam into a steam expansion chamber located in the cylinder between the piston and the cylinder head, an admission valve mechanism element for opening the admission valve that admits steam into the cylinder proximate the beginning of a power stroke of the piston, an exhaust valve having a valve end face in a wall of the expansion chamber for exhausting steam from the steam expansion chamber during an exhaust stroke, an exhaust valve mechanism element that holds the exhaust valve open during a substantial part of each exhaust stroke, and a member that closes the exhaust valve when the admission valve opens proximate dead center at an end of each exhaust stroke such that any compression at the end of the exhaust stroke is substantially compression due to the closing of the exhaust valve that is able to trap a remaining residual fraction of an initial steam mass, wherein an operative connection between the piston and the crankshaft establishes a clearance between the piston and the cylinder head to be at a minimum during a transition from exhaust to admission and about 8% or less of the clearance at a beginning of said exhaust stroke, wherein a clearance volume of the steam expansion chamber is devoid of an empty recess that contributes substantially to the clearance volume, and wherein the steam expander is a part of a dual cycle internal combustion steam engine having at least one combustion chamber therein for burning fuel and a combustion exhaust port connected for providing exhaust gasses to fire a heater for steam that is supplied to the steam expansion chamber of the engine and the valves are both actuated by a force applied thereto by piston movement.

63. A steam expander of an engine comprising:

at least one cylinder, a cylinder head and a piston that is slidably and sealingly mounted in the cylinder and is operatively connected to a crankshaft for imparting rotation to the crankshaft, a steam admission valve operatively associated with the cylinder for admitting steam into a steam expansion chamber located in the cylinder between the piston and the cylinder head, an exhaust valve operatively associated with the cylinder for exhausting steam from the steam expansion chamber, wherein the admission valve is a poppet valve comprising a poppet piston having a cylindrical sidewall slidably and sealingly enclosed within a cylindrical bore that terminates in a valve seat and the poppet piston is yieldably biased toward a closed position against the valve seat in the engine at one end of the bore, the poppet piston having a valve face that extends centrally from the sidewall to form a seal against the seat when the admission valve is closed, a steam supply chamber in the engine communicating between the bore and a steam supply, such that with the poppet piston in the closed position steam in the supply chamber is unable to apply an axial force on the poppet piston but when the valve is at least partially open steam from the supply chamber is able to flow into the bore between the face of the poppet piston and the steam expansion chamber to thereby create a pressure differential across the poppet piston that exerts an axial lifting force on the poppet piston which slides the poppet piston open by means of the lifting force of the steam to a more fully open position and wherein the bore communicates through a steam admission port in the cylinder head with the steam expansion chamber of the cylinder and the poppet piston is at least partially opened by a member selected from the engine piston, a lifter on the engine piston or on the poppet piston, an electrical solenoid for starting or running the engine and a cam that is operatively connected to the engine.

64. A steam expander of an engine comprising:

at least one cylinder having a cylinder head and a piston that is slidably and sealingly mounted in the cylinder and is operatively connected to a crankshaft for imparting rotation to the crankshaft, a steam admission valve located in the cylinder head for injecting steam into a steam expansion chamber located in the cylinder between the piston and the cylinder head, an admission valve mechanism element for opening the admission valve that admits steam into the cylinder proximate the beginning of a power stroke of the piston, an exhaust valve having a valve end face in a wall of the expansion chamber for exhausting steam from the steam expansion chamber during an exhaust stroke; wherein the exhaust valve is open during a substantial part of each exhaust stroke, an exhaust valve mechanism element for closing the exhaust valve when the admission valve opens proximate an end of each exhaust stroke such that any compression at the end of the exhaust stroke is substantially compression due to the closing of the exhaust valve that is able to trap a remaining residual fraction of the initial steam mass which was not exhausted, wherein an operative connection between the piston and the crankshaft establishes a clearance between the piston and the cylinder head to be at a minimum during a transition from exhaust to admission and about 8% or less of the clearance at a beginning of said exhaust stroke, wherein a clearance volume of the steam expansion chamber is devoid of an empty recess that contributes substantially to the clearance volume; and wherein the steam admission valve further comprises, a pair of valve elements including an outer admission valve element having a poppet valve face at an end thereof and a sidewall slidably supported in the engine, a first valve seat for the poppet valve face surrounding a steam admission port to the engine cylinder, a core valve element being slidably mounted in the outer admission valve element for engaging a second valve seat between the core element and the outer admission valve element to control steam flow therethrough, and wherein said admission valve mechanism element is the piston or a lifter for opening the admission valve to allow steam to flow from a steam supply into the engine cylinder when the admission valve is opened by the piston or by the lifter.

65. A steam expander of an engine comprising:

at least one cylinder having a cylinder head and a piston that is slidably and sealingly mounted in the cylinder and is operatively connected to a crankshaft for imparting rotation to the crankshaft, a steam admission valve located in the cylinder head for injecting steam into a steam expansion chamber located in the cylinder between the piston and the cylinder head, an admission valve mechanism element for opening the admission valve that admits steam into the cylinder proximate the beginning of a power stroke of the piston, an exhaust valve having a valve end face in a wall of the expansion chamber for exhausting steam from the steam expansion chamber during an exhaust stroke, an exhaust valve mechanism element that holds the exhaust valve open during a substantial part of each exhaust stroke, and a member that closes the exhaust valve when the admission valve opens proximate dead center at an end of each exhaust stroke such that any compression at the end of the exhaust stroke is substantially compression due to the closing of the exhaust valve that is able to trap a remaining residual fraction of an initial steam mass, wherein the operative connection between the piston and the crankshaft establishes a clearance between the piston and the cylinder head to be at a minimum during a transition from exhaust to admission and about 8% or less of the clearance at a beginning of said exhaust stroke, and wherein a clearance volume of the steam expansion chamber is devoid of an empty recess that contributes substantially to the clearance volume, wherein the steam expander is a part of a dual cycle internal combustion steam engine having at least one combustion chamber therein for burning fuel and a combustion exhaust port connected for providing exhaust gasses to fire a heater for steam that is supplied to the steam expansion chamber of the engine and the valves are both actuated by a force applied thereto by piston movement, and wherein the dual cycle internal combustion steam engine includes a fixed inward cylinder head within the cylinder, at least one piston is slidably and sealingly mounted with respect to both the cylinder and the inward cylinder head, and the steam, inlet and exhaust valves are disposed in a side-by-side relationship within the inward cylinder head.

\* \* \* \* \*

UNITED STATES PATENT AND TRADEMARK OFFICE
CERTIFICATE OF CORRECTION

PATENT NO.        : 8,448,440 B2
APPLICATION NO.   : 12/959025
DATED             : May 28, 2013
INVENTOR(S)       : Jerry A. Peoples and James V. Harmon, Sr.

Page 1 of 1

It is certified that error appears in the above-identified patent and that said Letters Patent is hereby corrected as shown below:

In the Specification:
Column 4, line 31, before "show" change "FIG. 2" to -- FIG. 1 --.

In the Claims:
Column 19, line 42 (Claim 7, line 2) delete "of".
Column 19, line 59 (Claim 9, line 7) change "yieldable" to -- yieldably --.
Column 20, line 54 (Claim 15, line 5) change "fires" to -- fire --.
Column 21, line 18 (Claim 19, line 16) after "and" insert -- the --.
Column 21, line 50 (Claim 20, line 14) after "less" insert -- than --.
Column 22, line 11 (Claim 21, line 7) change "yieldable" to -- yieldably --.
Column 22, line 65 (Claim 23, line 13) after "of" insert -- the --.
Column 23, line 1 (Claim 23, line 16) delete "is".
Column 27, line 25 (Claim 46, line 20) delete "exhaust valve" (second occurrence).
Column 27, line 43 (Claim 47, line 3) after "between" insert -- the --.
Column 34, line 62 (Claim 65, third line from the end) after "steam" delete ",".

Signed and Sealed this
Fifteenth Day of March, 2016

Michelle K. Lee
*Director of the United States Patent and Trademark Office*